US009241331B2

(12) United States Patent
Nandagopalan et al.

(10) Patent No.: US 9,241,331 B2
(45) Date of Patent: Jan. 19, 2016

(54) METHOD AND SYSTEM FOR OPTIMAL BEAMFORMING IN WIRELESS NETWORKS

(71) Applicant: Broadcom Corporation, Irvine, CA (US)

(72) Inventors: Saishankar Nandagopalan, San Diego, CA (US); Christopher Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/047,385

(22) Filed: Oct. 7, 2013

(65) Prior Publication Data
US 2014/0029593 A1 Jan. 30, 2014

Related U.S. Application Data

(63) Continuation of application No. 12/401,222, filed on Mar. 10, 2009, now Pat. No. 8,553,659.

(60) Provisional application No. 61/036,006, filed on Mar. 12, 2008.

(51) Int. Cl.
*H04W 72/04* (2009.01)
*H04W 84/18* (2009.01)
*H04W 84/12* (2009.01)
*H04W 74/06* (2009.01)
*H04W 16/28* (2009.01)
*H04W 74/08* (2009.01)

(52) U.S. Cl.
CPC .......... *H04W 72/0446* (2013.01); *H04W 74/06* (2013.01); *H04W 84/12* (2013.01); *H04W 84/18* (2013.01); *H04W 16/28* (2013.01); *H04W 74/0808* (2013.01)

(58) Field of Classification Search
CPC .................. H04W 72/0446; H04W 72/0406; H04W 72/04; H04W 84/18; H04W 84/12; H04W 16/28; H04W 74/06; H04W 74/0808
USPC ................... 370/336–338, 329; 455/273, 522
See application file for complete search history.

(56) References Cited

U.S. PATENT DOCUMENTS

| 2005/0083896 | A1 | 4/2005 | Hong et al. |
| 2005/0135307 | A1 | 6/2005 | Yang et al. |
| 2007/0155353 | A1 | 7/2007 | Shapira et al. |
| 2007/0286130 | A1 | 12/2007 | Shao et al. |
| 2008/0112369 | A1 | 5/2008 | Kwon |
| 2008/0232393 | A1* | 9/2008 | Dharmaraju et al. ......... 370/453 |

* cited by examiner

*Primary Examiner* — Pao Sinkantarakorn
*Assistant Examiner* — Richard Chang
(74) *Attorney, Agent, or Firm* — Oblon, McClelland, Maier & Neustadt, L.L.P.

(57) ABSTRACT

Aspects of a method and system for optimal beamforming in a wireless network are presented. Aspects of the system may include one or more processors for use in a requesting communication device wherein the one or more processors may be operable to request a transmission time slot allocation. A determination may be made by a coordinating communication device as whether to assign a sector transmission time slot and/or beamforming transmission time slot to the requesting communication device based on the transmission time slot allocation request. The one or more processors may be operable to receive the assigned sector transmission time slot and/or beamforming transmission time slot.

20 Claims, 23 Drawing Sheets

| B1 802 | CAP_1 804 | Sector_1 CTA Period 806 | B2 808 | CAP_2 810 | Sector_2 CTA Period 812 | B3 814 | CAP_3 816 | Sector_3 CTA Period 818 | B4 820 | CAP_4 822 | Sector_4 CTA Period 824 |

METHOD AND SYSTEM FOR OPTIMAL BEAMFORMING IN WIRELESS NETWORKS

CROSS-REFERENCE TO RELATED APPLICATIONS/INCORPORATION BY REFERENCE

This application is a continuation of U.S. application Ser. No. 12/401,222, filed Mar. 10, 2009 which makes reference to, claims priority to, and claims the benefit of U.S. Provisional Application Ser. No. 61/036,006, filed Mar. 12, 2008.

This application makes reference to U.S. patent application Ser. No. 12/397,435 filed Mar. 4, 2009.

Each of the above stated applications is hereby incorporated herein by reference in its entirety.

FIELD OF THE INVENTION

Certain embodiments of the invention relate to data communication. More specifically, certain embodiments of the invention relate to a method and system for optimal beamforming in wireless networks.

BACKGROUND OF THE INVENTION

IEEE 802.15 describes a communication architecture, which may enable communicating devices (DEVs) to communicate via wireless personal area networks (WPANs). Many DEVs utilized in WPANs are small or handheld devices, such as personal digital assistants, portable computers, or consumer electronics devices such as digital video recorders or set top boxes. IEEE 802.15 is a short-range wireless communications standard that enables connection between consumer and computer equipment while eliminating wires. IEEE 802.15 WPAN DEVs may utilize frequencies in the 57 GHz to 66 GHz range for communication.

A plurality of communicating DEVs in a WPAN environment may comprise a network known as a piconet. One of the DEVs in a piconet may function as a piconet coordinator (or controller), or PNC. The PNC may provide overall coordination for the communication between DEVs in a piconet. The piconet may comprise the PNC and DEVs, which are associated with the PNC.

Communications between communicating DEVs in a WPAN may occur within time intervals referred to as superframes. The superframe may comprise a plurality of segments. In a first superframe segment, the PNC may transmit one or more beacon frames. The beacon frame may enable recipient DEVs to identify the PNC. The beacon frame may also enable recipient DEVs to identify other DEVs, which are currently associated with PNC within the piconet. In addition, a beacon frame may indicate time durations within the current superframe during which assigned DEVs may transmit and/or receive signals via a wireless communication medium. These time durations may be referred to as time slots. The time slot assignments may be in response to requests received from the DEVs during one or more previous superframes.

A second superframe segment may comprise a contention access period (CAP). The starting time instant and time duration of the CAP may be communicated within the preceding beacon frame. During the CAP, the DEVs may respond to the beacon frames by communicating with the PNC to establish an association within the piconet. Associations established during a current superframe may be reported via beacon frames in one or more subsequent superframes.

The DEVs within the piconet may also utilize the CAP to communicate data to other DEVs. Communicating DEVs may attempt to gain access to the wireless communication medium before attempting to transmit data. The collision sense multiple access with collision avoidance (CSMA/CA) protocol is typically utilized by communicating devices for wireless medium access. During the CAP, a DEV seeking medium access, an originating DEV, may transmit a request to send (RTS) frame. The RTS frame may be addressed to a destination DEV but the RTS frame may be received by other DEVs. The destination DEV may respond to the RTS frame by transmitting a clear to send (CTS) frame. The originating DEV and destination DEV may subsequently commence communication via the wireless medium. The communications may, for example, involve the transmission of data frames between the originating DEV and the destination DEV. Direct communications between an originating DEV and a destination DEV during the CAP are typically intermittent communications, which comprise relatively short time durations. In accordance with the CSMA/CA protocol, other DEVs that receive the RTS frame transmitted by the originating DEV may refrain from transmitting signals via the wireless medium during these communications. When an originating DEV seeks to reserve access to the wireless medium for longer time durations, the originating DEV may transmit an RTS frame to the PNC during the CAP. The PNC may respond to the originating RTS frame by sending an acknowledgment frame that comprises a time allocation slot.

A third superframe segment may comprise a channel time allocation (CTA) period. The CTA period may comprise one or more CTA time slots. During the CTA period, the PNC may assign and/or schedule a set of CTA time slots to one or more DEVs within the piconet. The PNC may communicate a time allocation slot to an assigned DEV during the CAP that identifies a specific CTA time slot. During the assigned CTA time slot the assigned DEV may be granted reserved access to the wireless communication medium. The assigned DEV may utilize the assigned CTA time slot to engage in communications with one or more destination DEVs. Other DEVs, which are not engaged in communications with the originating DEV, may refrain from transmitting signals via the wireless communication medium during the assigned CTA time slot. In conventional piconet systems, an individual CTA time slot is assigned to a single DEV. Thus, a single DEV may transmit signals via the wireless communication medium during a given CTA time slot.

The CTA period may also comprise a management CTA (MCTA) period. During the MCTA period, DEVs may request CTA time slot assignments from the PNC. The PNC may respond to CTA time slot allocation requests received in the current superframe by making CTA time slot assignments for one or more subsequent superframes. The time slot assignments may be reported via beacon frames transmitted during the respective subsequent superframes.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for optimal beamforming in wireless networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is a diagram of an exemplary superframe structure for directional signal transmission and reception, in accordance with an embodiment of the invention.

DETAILED DESCRIPTION OF THE INVENTION

Certain embodiments of the invention may be found in a method and system for optimal beamforming in wireless networks. Various embodiments of the invention may comprise a method and system by which a piconet controller (PNC) within a piconet may make channel time allocation (CTA) time slot assignments in response to requests from requesting communicating devices (DEVs) based on the capabilities of the communicating DEVs within the piconet.

In one aspect of an exemplary embodiment of the invention, a PNC may divide a physical region, referred to as an area, into a plurality of sectors. Based on communications with the DEVs within a piconet, a PNC may determine a physical location for each of the DEVs. In various embodiments of the invention, the physical locations of the DEVs may be represented in a neighborhood map. The PNC may allocate one or more CTA time slots for at least a portion of the sectors. The CTA time slots allocated to a given sector may be referred to as a sector CTA period. In each sector for which one or more CTA time slots has been allocated, the PNC may assign one or more CTA time slots to at least a portion of the DEVs physically located within the sector.

In another aspect of an exemplary embodiment of the invention, the PNC may determine that one or more of the DEVs are operable to support beamformed transmission of signals. The PNC may allocate one or more CTA time slots for beamformed transmission of signals. The CTA time slots allocated for beamformed signal transmission may be referred to as a beamformed CTA period.

In various embodiments of the invention, the PNC may concurrently assign a given CTA time slot to a plurality of DEVs based on the neighborhood map. The concurrent CTA time slot assignments may be made such that signal transmissions from each concurrently transmitting DEV do not impair reception of signals transmitted by the remaining concurrently transmitting DEVs.

Figure 1:
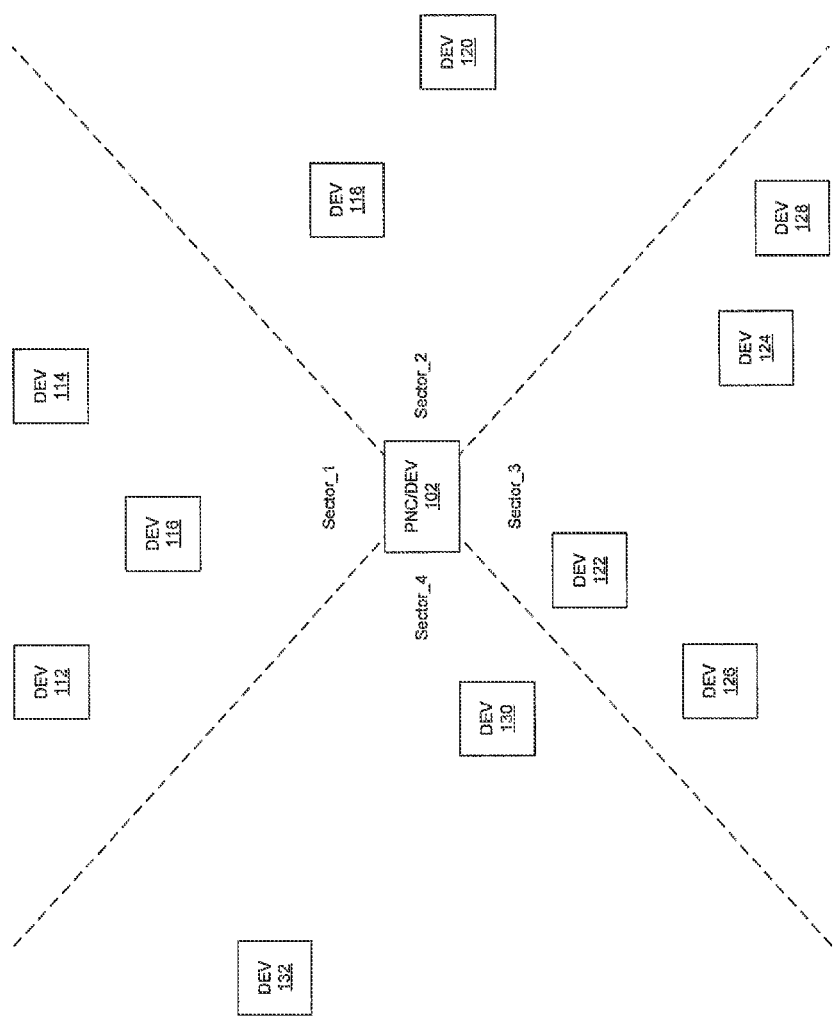
FIG. 1 is an exemplary wireless communication system, in accordance with an embodiment of the invention.

FIG. 1 is an exemplary wireless communication system, in accordance with an embodiment of the invention. Referring to FIG. 1, there is shown an exemplary piconet, which comprises a PNC 102 and a plurality of DEVs 112, 114, 116, 118, 120, 122, 124, 126, 128, 130 and 132. The PNC 102 also comprises DEV functionality. In various embodiments of the invention, the PNC 102 may utilize a plurality of directional antennas to transmit signals to the DEVs 112, 114, 116, 118, 120, 122, 124, 126, 128, 130 and/or 132. Each of directional antennas may be operable to transmit and/or receive signals within an RF coverage area, which comprises a portion of the areas surrounding the PNC 102. This RF coverage area may be referred to as a sector.

FIG. 1 presents an exemplary PNC 102, which utilizes directional antennas, a portion of which are operable to transmit and/or receive signals within one of four sectors: Sector_1, Sector_2, Sector_3 and Sector_4. Within Sector_1, the PNC 102 may communicate with DEVs 112, 114 and/or 116. Within Sector_2, the PNC 102 may communicate with the DEVs 118 and/or 120. Within Sector_3, the PNC 102 may communicate with the DEVs 122, 124, 126 and/or 128. Within Sector_4, the PNC 102 may communicate with the DEVs 130 and/or 132. Various embodiments of the invention may be practiced when the number of sectors is greater than four or less than four. Various embodiments of the invention may be practiced when the PNC 102 utilizes one or more steerable antennas, each of which may be oriented at a given time instant to enable transmission and/or reception of signals from a sector selected from the one or more sectors. Various embodiments of the invention may also be practiced when utilizing a combination of one or more sectorized antennas and one or more steerable antennas. Various embodiments of the invention may be practiced when utilizing one or more sectorized antennas, one or more steerable antennas and/or one or more omnidirectional antennas.

In an exemplary embodiment of the invention, which utilizes one or more omnidirectional antennas and one or more sectorized antennas and/or one or more steerable antennas, a PNC 102 may utilize the one or more omnidirectional antennas to communicate with the DEVs 112, 114, 116, 118, 120, 122, 124, 126, 128, 130 and 132 in instances in which data rates for transmitted signals is comparatively low. By comparison, the PNC 102 may utilize the one or more sectorized antennas and/or steerable antennas to communicate with the DEVs 112, 114, 116, 118, 120, 122, 124, 126, 128, 130 and 132 in instances in which data rates for transmitted signals are comparatively high, for example data rates greater than 1 Gbps.

When utilizing directional antennas for receiving signals, the PNC 102 may determine an angle of arrival (AOA) for signals received from any of the DEVs 112, 114, 116, 118, 120, 122, 124, 126, 128, 130 and 132. In the exemplary wireless communication system shown in FIG. 1, the PNC 102 may determine that the AOA is within one or for 90° ranges. For example, the AOA range for signals received from Sector_1 may be −45° to 45°, the AOA range for signals received from Sector_2 may be 45° to 135°, the AOA range for signals received from Sector_3 may be 135° to −135° and the AOA range for signals received from Sector_4 may be −135° to −45°. Based on the AOA range for the received signals, the PNC 102 may be able to identify the sector in which the transmitting device is physically located. Based on communications with the DEVs 112, 114, 116, 118, 120, 122, 124, 126, 128, 130 and 132, the PNC 102 may generate a neighborhood map, which identifies the physical location of each of the DEVs 112, 114, 116, 118, 120, 122, 124, 126, 128, 130 and 132 in relation to the PNC 102. In addition, each of the DEVs may generate neighborhood map, which may be communicated to the PNC 102. By receiving neighborhood maps from each of the DEVs, the neighborhood map generated by the PNC 102 may also identify the physical location of each DEV in relation to other neighboring DEVs.

A method and system for generation of neighborhood maps is described in U.S. patent application Ser. No. 12/397,435, which is hereby incorporated herein by reference in its entirety.

Figure 2:
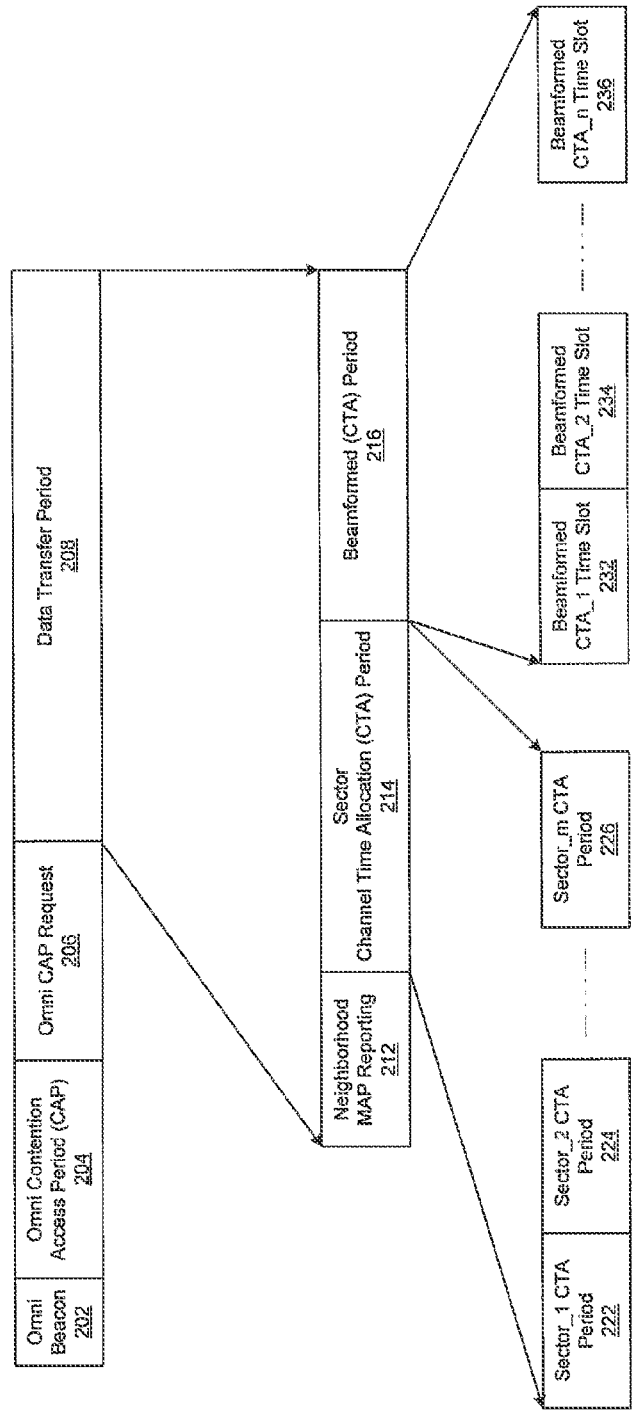
FIG. 2 is a diagram of an exemplary superframe for omnidirectional signal transmission and reception, in accordance with an embodiment of the invention.

FIG. 2 is a diagram of an exemplary superframe for omnidirectional signal transmission and reception, in accordance with an embodiment of the invention. Referring to FIG. 2, there is shown a beacon frame 202, a contention access period (CAP) 204, a CAP request 206, and data transfer period 208. Signals transmitted during the beacon frame 202, the CAP 204 and CAP request 206 may be transmitted by communication devices (Com_DEV), which utilize omnidirectional signal transmission. The beginning time instant and time duration for the CAP 204, the CAP request 206 and the data transfer period 208 may be specified within the beacon frame 202. The data transfer period may comprise a neighborhood map reporting period 212, a sector CTA period 214, and a beamformed CTA period. The sector CTA period 214 may comprise a Sector_1 CTA period 222, a Sector_2 CTA period 224 through a Sector_m CTA period 226 (where m represents a number of sectors associated with a piconet). The beamformed CTA period 216 may comprise a plurality of time slots as represented by beamformed CTA_1 time slot 232, beamformed CTA_2 time slot 234 through beamformed CTA_n time slot 236 (where n represents a number of beamformed CTA time slots allocated within the superframe.

In various embodiments of the invention, the beacon frame 202 may be transmitted by a PNC, which utilizes omnidirectional signal transmission. With reference to FIG. 1, an exemplary PNC 102 may utilize neighborhood map information received during the neighborhood map reporting period 212 in a preceding superframe(s) to generate a set of CTA time slot assignments for requesting DEVs within the piconet. The PNC 102 may identify DEVs that are associated with the piconet based on association and/or authentication communications received from DEVs during the CAP 204 in a preceding superframe(s). During the neighborhood map reporting period 212, a PNC 102 may receive neighborhood map information from one or more of the DEVs 112, 114, 116, 118, 120, 122, 124, 126, 128, 130 and 132. The PNC 102 may select requesting DEVs among the DEVs 112, 114, 116, 118, 120, 122, 124, 126, 128, 130 and 132 within the piconet based on requests received by the PNC 102 during the Omni CAP request period 206 in a preceding superframe(s).

In an exemplary embodiment of the invention, based on a request received from a given requesting DEV, the PNC 102 may identify an originating Com_DEV and one or more destination Com_DEVs, which are to participate in communication during the requested CTA time slot. Based on the received neighborhood map information, the PNC 102 may concurrently assign a given CTA time slot to a plurality of requesting DEVs. For example, if the requesting DEV 122 requests a CTA time slot for communication with the DEV 126 and if requesting the DEV 124 requests a CTA time slot for communication with the DEV 128, the PNC may concurrently assign a given CTA time slot to the DEV 122 and to the DEV 124. Each of the Com DEVs, DEV 122, DEV 124, DEV 126 and/or DEV 128 may engage in their respective communications while utilizing directional signal transmissions. The concurrent CTA time slot assignment may enable the DEV 122 to communicate with DEV 126 via the wireless communication medium while the DEV 124 concurrently communicates with the DEV 128 via the wireless communication medium. In one aspect of an exemplary embodiment of the invention, the PNC 102 may utilize the received neighborhood map information to determine whether transmission of signals from the DEV 124 may inhibit the ability of the DEV 122 and the DEV 126 to communicate via the wireless communication medium. Similarly, the PNC 102 may determine whether transmission of signals from the DEV 122 may inhibit the ability of the DEV 124 and the DEV 128 to communicate via the wireless communication medium.

In various embodiments of the invention a Com_DEV may evaluate whether the ability to communicate with one or more other Com_DEVs is inhibited during an assigned CTA time slot, for example as a result of concurrently transmitted interference signals. The Com_DEV may communicate a communication interference report indicating the detection of such interference to the PNC. The communication interference report may be communicated to the PNC during the CAP request period 206. The PNC may utilize the communication interference report when generating CTA time slot assignments in a subsequent superframe(s).

A method and system for assignment of CTA time slots based on neighborhood map information is described in U.S. patent application Ser. No. 12/397,435, which is hereby incorporated herein by reference in its entirety. In various embodiments of the invention, a PNC may communicate generated neighborhood map information to other DEVs via the beacon frame 202.

Each of the sector CTA periods Sector_1 CTA period 222, Sector_2 CTA 224, and Sector_m CTA 226 refers to a CTA period for communications within a corresponding sector. Referring to FIG. 1, there may be four sector CTA periods, one for each sector shown in FIG. 1 (where m=4). The sector CTA periods may comprise a Sector_1 CTA period, a Sector_2 CTA period, a Sector_3 period and a Sector_4 period. CTA time slots within the Sector_1 CTA period may be requested by Com_DEVs within Sector_1. The Com_DEVs within Sector_1 comprise the DEV 112, the DEV 114 and the DEV 116. The CTA time slots within the Sector_2 CTA period may be requested by the Com_DEVs within Sector_2. The Com_DEVs within Sector_2 comprise the DEV 118 and the DEV 120. The CTA time slots within the Sector_3 CTA period may be requested by the Com_DEVs within Sector_3. The Com_DEVs within Sector_3 comprise the DEV 122, the DEV 124, the DEV 126 and the DEV 128. The CTA time slots within the Sector_4 CTA period may be requested by the Com_DEVs within Sector_4. The Com_DEVs within Sector_4 comprise the DEV 130 and the DEV 132.

In various embodiments of the invention, communication between the Com_DEVs in one sector may not inhibit communication between the Com_DEVs in another sector. Therefore, at least a portion of a CTA time slot within the Sector_1 CTA period 222 may be coincident in time with at least a portion of a CTA time slot within the Sector_2 CTA period 224, for example. In this regard, communication between the Com_DEVs within one sector may be concurrent with communication between the Com_DEVs within another sector. Referring to FIG. 1, the PNC 102 may assign a Sector_1 CTA time slot within the Sector_1 CTA period 222 for communication between the DEV 112 and the DEV 114. The PNC 102 may assign a Sector_3 CTA time slot within the Sector_2 CTA period 224 for communication between the DEV 118 and the DEV 120. In an exemplary embodiment of the invention, at least a portion of the Sector_1 CTA time slot may be coincident in time with at least a portion of the Sector_2 CTA time slot. In this regard, communication between the DEV 112 and the DEV 114 may occur concurrently with communication between the DEV 118 and the DEV 120.

During association and/or authentication communications with a DEV, a PNC may determine a capabilities set for the DEV. For example, referring to FIG. 1, during association and/or authentication communications the PNC 102 may determine that the DEV 122, the DEV 124 and the DEV 126 support beamformed signal transmission while the DEV 128 does not. After completion of authentication and/or authentication communications with the DEVs 122, 124, 126 and/or 128, the PNC 102 may communicate the association of these DEVs in the piconet and corresponding capabilities for each of the DEVs via a beacon frame, which may be transmitted in a subsequent superframe.

In various embodiments of the invention, a DEV, which has been activated, for example by being powered on, may utilize a receiving antenna(s) to enable reception of (or "listen for") beacon frames 202 transmitted via the wireless communication medium. Upon receiving a beacon frame 202, the DEV may respond by initiating association and/or authentication communications with the PNC. The period of time for which a DEV may wait while listening for a transmitted beacon frame 202 may be referred to as a MaxSuperFrameDuration period. The time duration for the MaxSuperFrameDuration period (measured in units of time such as milliseconds, for example) may be specified by an applicable standards document, such as an IEEE 802 specification document. The MaxSuperFrameDuration may correspond to a maximum time duration for a superframe. A time duration for a superframe, referred to as a SuperFrameDuration, may be communicated by the PNC via the beacon frame 202.

Based on the capabilities of the originating Com_DEV and/or destination Com_DEV, a PNC may respond to a time slot allocation request from a requesting DEV by assigning a CTA time slot within the sector CTA period 214 and/or by assigning a CTA time slot within the beamformed CTA period 216 to the requesting DEV. For example, referring to FIG. 1, the PNC 102 may receive a time slot allocation request from the DEV 122 for communication between the DEV 122 and the DEV 126. The PNC 102 may also receive a time slot allocation request from the DEV 124 for communication between the DEV 124 and the DEV 128. The PNC 102 may assign beamformed CTA_1 time slot 232 for communication between the DEV 122 and the DEV 126 based on the capability of each of the DEV 122 and the DEV 126 to utilize beamformed signal transmission. The PNC 102 may assign a CTA time slot within a Sector_3 CTA period based on the lack of capability of the DEV 128 to utilize beamformed signal transmission. In various embodiments of the invention, a requesting DEV may request a CTA time slot based on a time slot type in the time slot allocation request. For example, a requesting the DEV 122 may communicate a time slot allocation request to the PNC 102 in which the requesting the DEV 122 requests a CTA time slot within the beamformed CTA period 216. A requesting DEV 124 may communicate a time slot allocation request to the PNC 102 in which the requesting DEV 124 requests a CTA time slot within the sector CTA period 214.

In various embodiments of the invention, a Com_DEV within a given sector may communicate with Com_DEVs in other sectors. For example, referring to FIG. 1, the DEV 112, within Sector_1 may communicate with the DEV 132 in Sector_4. The requesting the DEV 112 may send a time slot allocation request to the PNC 102 to request one or more CTA time slots within a given superframe, which may be utilized for communication between the DEV 112 and the DEV 132. The requested CTA time slot(s) may be selected from the sector CTA period 214 and/or from the beamformed CTA period 216.

Figure 3:
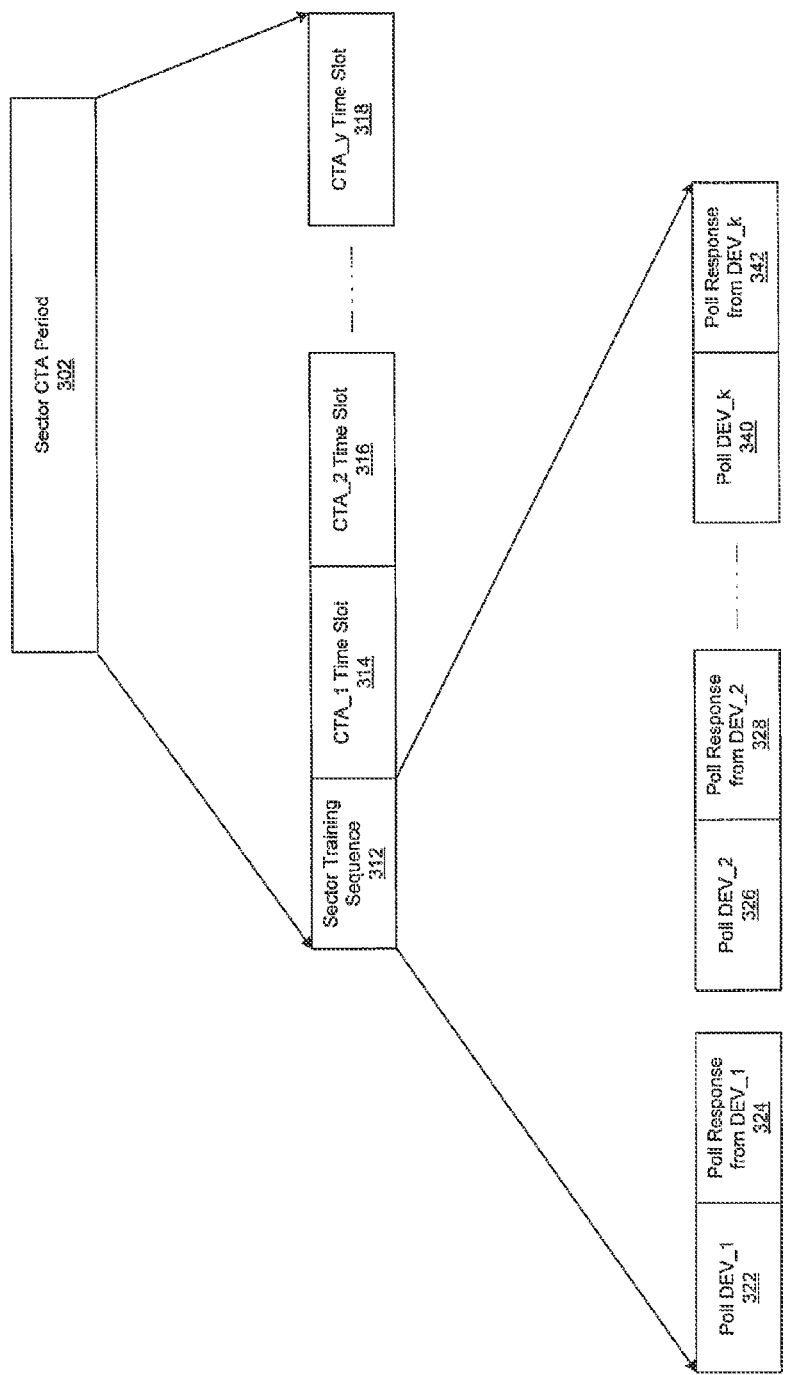
FIG. 3 is a diagram of an exemplary single sector channel time allocation period, in accordance with an embodiment of the invention.

FIG. 3 is a diagram of an exemplary single sector channel time allocation period, in accordance with an embodiment of the invention. Referring to FIG. 3, there is shown a sector CTA period 302. The sector CTA period 302 is exemplary of the Sector_1 CTA period 222, Sector_2 CTA period 224 through Sector_m CTA period 226 presented in FIG. 2. The sector CTA period 302 may comprise a sector training sequence 312, and a plurality of CTA time slots: CTA_1 time slot 314, CTA_2 time slot 316 through CTA_y time slot 318, where y represents the number of CTA time slots associated with the Sector CTA period 302. The sector training sequence 312 comprises a poll message 322, a poll response message 324, a poll message 326, a poll response message 328, a poll message 340 and a poll response message 342. The poll message 322 may be sent to a Com_DEV, DEV_1, to which CTA_1 time slot 314 was assigned. The poll response message 324 may be received in response to the poll message 322 from DEV_1. The poll message 326 may be sent to a Com_DEV, DEV_2, to which CTA_2 time slot 316 was assigned. The poll response message 328 may be received in response to the poll message 326 from DEV_2. The poll message 340 may be sent to a Com_DEV, DEV_k (where k represents the number of requesting Com_DEVs within the sector), to which CTA_y time slot 318 was assigned (where y represents the number of CTA time slots within the sector CTA period 302). The poll response message 342 may be received in response to the poll message 340 from DEV_k.

In various embodiments of the invention, for sectorized communication between Com_DEVs, a coordinating communication device (C_Com_DEV) may utilize the sector training sequence 312 to poll Com_DEVs, which may utilize assigned CTA time slots within a sector CTA period 302. The poll sent via a poll message by the C_Com_DEV may comprise a training sequence, which enables an originating Com_DEV to compute channel estimates and/or channel state information (CSI). The channel estimates and/or CSI computed in response to the received poll message by the originating Com_DEV may be sent to the C_Com_DEV via a poll response message. The C_Com_DEV may also send a poll message to one or more destination Com_DEVs. The channel estimates and/or CSI computed in response to the received poll message by each recipient destination Com_DEV may be sent to the C_Com_DEV via a poll response message. The C_Com_DEV may send the channel estimates and/or CSI computed by the originating Com_DEV to each of the one or more destination Com_DEVs. In addition, the C_Com_DEV may send the channel estimates and/or CSI computed by each of the one or more destination Com_DEVs to the originating Com_DEV. The originating Com_DEV and/or destination Com_DEV(s) may utilize received channel estimates and/or CSI when generating signals for transmission during the assigned CTA time slot(s).

In various embodiments of the invention, the C_Com_DEV may receive the poll response messages from the originating Com_DEV and each of the destination Com_DEVs. The C_Com_DEV may then generate sector channel estimates and/or sector CSI based on the received poll response messages and/or based on neighborhood map information. The C_Com_DEV may communicate the sector channel estimates and/or sector CSI to the originating Com_DEV and each of the destination Com_DEVs.

After the C_Com_DEV polls each of the plurality of requesting Com_DEVs, DEV_1, DEV_2, ..., and DEV_k, to which CTA time slots have been assigned within sector CTA period 302, the requesting Com_DEVs may communicate during their respective assigned CTA time slots. For example, DEV_1 may communicate during assigned CTA_1 time slot 314, DEV_2 may communicate during assigned CTA_2 time slot 316 and DEV_k may communicate during assigned CTA_y time slot 318. In various embodiments of the invention, one or more of the CTA time slots 314, 316, ..., and 318 may be assigned to a given one or more of the requesting Com_DEVs, DEV_1, DEV_2, ..., and DEV_k.

Referring to FIG. 1, the PNC 102 may comprise an exemplary C_Com_DEV. In an exemplary embodiment of the invention in which the DEV 112 communicates with the DEV 114 during an assigned CTA_1 time slot 314, the PNC 102 may send a poll message 322 to the DEV 112 and to the DEV 114. The DEV 112 may each compute channel estimates and/or channel state information, CSI_112, in response to the received poll message 322. The DEV 114 may also compute channel estimates and/or channel state information, CSI_114, in response to the received poll message 322. The DEV 112 may each communicate at least a portion of CSI_112 to the PNC 102 via a poll response message 324. The DEV 114 may also communicate at least a portion of CSI_114 to PNC 102 via a poll response message 324. The PNC 102 may communicate at least a portion of the received CSI_112 to DEV 114. In addition, the PNC 102 may communicate at least a portion of the received CSI_114 to the DEV 112. The DEV 112 may utilize at least a portion of the received CSI_114 when communicating with the DEV 114 during the assigned CTA_1 time slot 314. The DEV 114 may utilize at least a portion of the received CSI_112 when communicating with the DEV 112 during the assigned CTA_1 time slot 314.

In various embodiments of the invention, the PNC 102 may generate sector channel estimates and/or sector CSI based on the received CSI_112, the received CSI_114 and neighborhood map information. For example, the PNC 102 may utilize the neighborhood map information to determine the physical location of the DEV 112 relative to the DEV 114. The PNC 102 may then estimate the sector channel estimates and/or sector CSI based on the determination of relative physical locations of the communicating devices.

A polled Com_DEV may compute gain values (measured in dB, for example) in response to a received poll message. The computed gain values may be utilized to determine signal amplification levels and/or signal levels for transmitted signals. At least a portion of the computed gain values may be communicated to the C_Com_DEV via a poll response message.

The polled Com_DEV may compute signal to noise ratio (SNR) values (measured in dB, for example) in response to a received poll message. The computed SNR values may be utilized to determine signal amplification levels and/or signals levels for transmitted signals. At least a portion of the computed SNR values may be communicated to the C_Com_DEV via a poll response message.

The polled Com_DEV may determine one more modulation and/or coding schemes (MCS) based on values computed in response to a received poll message. At least a portion of the determine MCS may be communicated to the C_Com_DEV via a poll response message.

In another exemplary embodiment of the invention, the C_Com_DEV may compute channel estimates, channel state information, gain values and/or SNR values and/or determine one or more MCS based on a received poll response message. The C_Com_DEV may communicate at least a portion of the computed channel estimates, channel state information, gain values and/or SNR values and/or at least a portion of the determined MCS to one or more Com_DEVs.

Various embodiments of the invention may be practiced when the polling message 322 is a polling protocol data unit (PDU). The polling PDU may comprise a frame (for example, an Ethernet frame), a packet (for example an IP packet) and/or a segment (for example, a TCP segment). The PDU may comprise a preamble field, which may be utilized by the transmitting Com_DEV as a training sequence. The preamble field may be utilized by a recipient Com_DEV for computation of channel estimates, CSI, one or more gain values and/or one or more SNR values and/or determination of one of more MCS. The preamble field may be specified in a relevant standards document.

Figure 4:
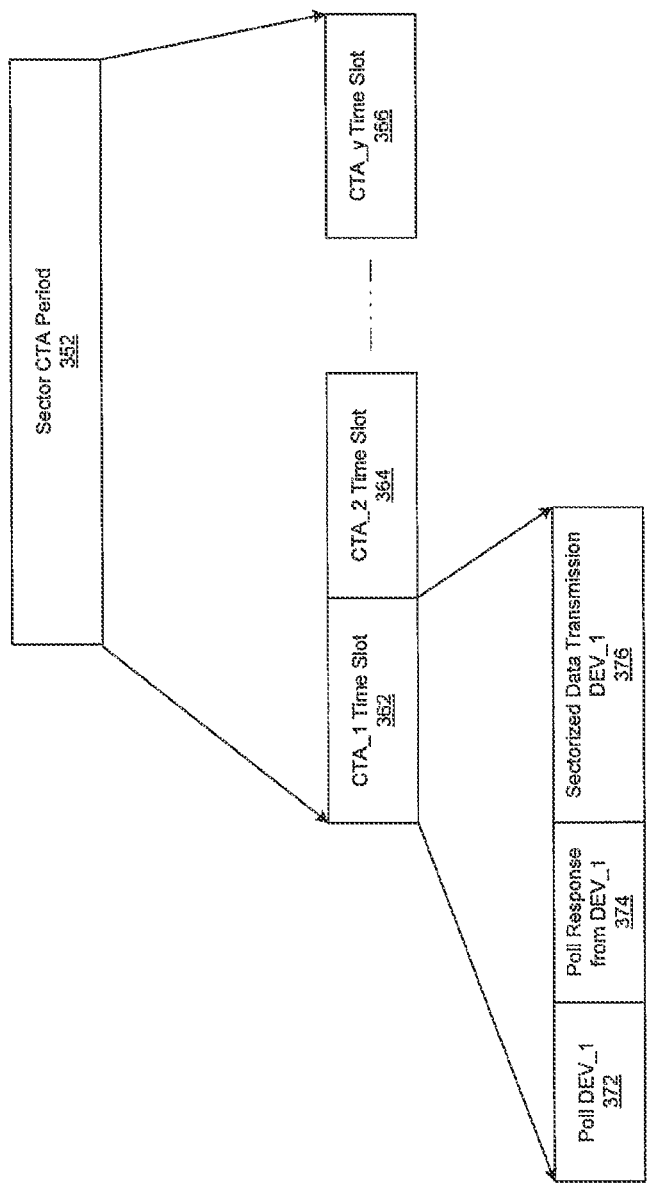
FIG. 4 is a diagram of an exemplary single sector channel time allocation period, in accordance with an embodiment of the invention.

FIG. 4 is a diagram of an exemplary single sector channel time allocation period, in accordance with an embodiment of the invention. Referring to FIG. 4, there is shown a sector CTA period 352. The sector CTA period 352 may comprise a plurality of CTA time slots: CTA_1 time slot 362, CTA_2 time slot 364 through CTA_y time slot 366. Each CTA time slot comprises a poll message 372, a poll response message 374 and a sectorized data transmission period 376.

In comparing FIG. 3 and FIG. 4, in FIG. 3, the C_Com_DEV may poll each of the plurality of Com_DEVs, which may communicate within the sector CTA period 302, during the sector training sequence 312. After the C_Com_DEV completes its polling of the plurality of Com_DEVs, the individual Com_DEVs may communicate during their respective assigned CTA time slot(s), CTA_1 314, CTA_2 316, . . . , and CTA_y 318. In FIG. 4, the C_Com_DEV may poll the plurality of Com_DEV, which may communicate during the CTA time slot CTA_1 362. After the C_Com_DEV completes its polling, the plurality of Com_DEVs may communicate during the sectorized data transmission period 376. At the end of CTA time slot CTA_1 362, the C_Com_DEV may repeat the procedure for CTA time slot CTA_2 364 through CTA time slot CTA_y 366.

In various embodiments of the invention, polling may be performed in each superframe or once in every X superframes. In instances in which polling is performed once in every X superframes the value X may be communicated to each of the Com_DEVs by the C_Com_DEV within a transmitted beacon frame 202. In an exemplary embodiment of the invention in which polling is not performed in each superframe, communications during CTA time slots within the sector CTA period 302 and/or 352 Com_DEVs may utilize information generated during the most current poll.

Figure 5:
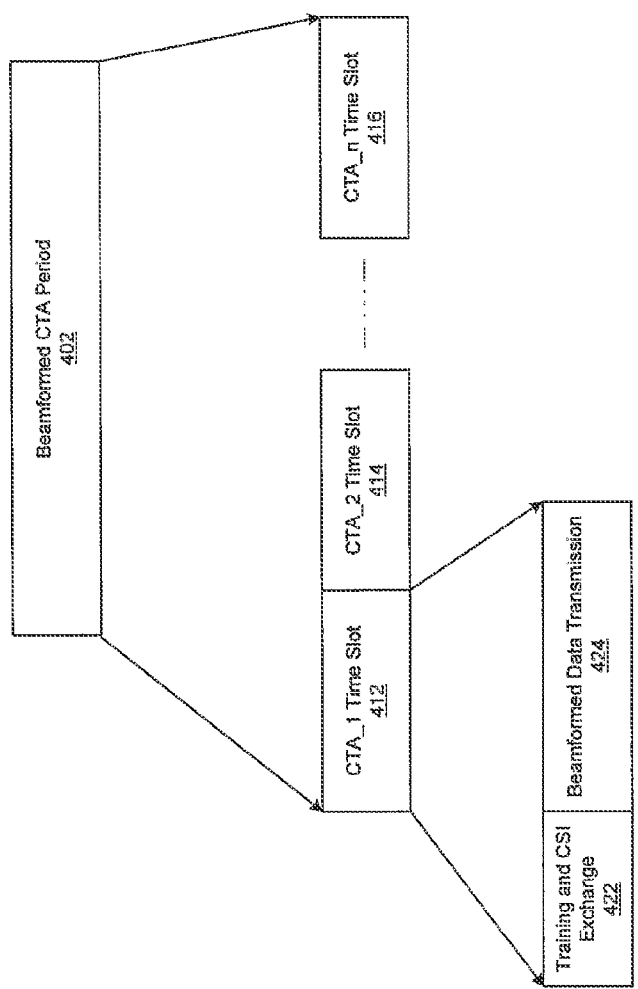
FIG. 5 is a diagram of an exemplary beamformed channel time allocation period, in accordance with an embodiment of the invention.

FIG. 5 is a diagram of an exemplary beamformed channel time allocation period, in accordance with an embodiment of the invention. Referring to FIG. 5, there is shown a beamformed CTA period 402. The beamformed CTA period 402 may comprise a plurality of CTA time slots: CTA_1 time slot 412, CTA_2 time slot 414 through CTA_n time slot 416, where n represents the number of CTA time slots associated with the beamformed CTA period 402. Each CTA time slot comprises a training and CSI exchange period 422 and a beamformed data transmission period 424.

In various embodiments of the invention for beamformed communication between Com_DEVs, a C_Com_DEV may assign a CTA time slot 412, 414, . . . , and/or 416 for communication between an originating Com_DEV and one or more destination Com_DEVs. During the assigned CTA time slot, the originating Com_DEV and one or more destination Com_DEVs may communicate training sequences and/or CSI during a traning and CSI exchange period 422. For example, the originating Com_DEV may generate a training sequence, which may be communicated to the one or more destination Com_DEVs. Based on the received training sequence, each of the destination Com_DEVs may compute channel estimates, CSI, gain values and/or SNR values and/or determine one or more MCS. One or more of the destination Com DEVs may communicate to the originating Com_DEV at least a portion of the computed channel estimates, CSI, gain values and/or SNR values and/or determined one or more MCS. The originating Com_DEV may utilize the received channel estimates, CSI, gain values and/or SNR values and/or determined MCS to generate a precoding matrix. The originating Com_DEV may utilize the precoding matrix to generate a plurality of transmit chain signals, which may be concurrently transmitted via a corresponding plurality of transmitting antennas. The concurrent transmission of the precoded signals may be referred to as beamformed signal transmission.

Similarly, a destination Com_DEV may generate a training sequence, which may be communicated to the originating Com_DEV during the training and CSI exchange period 422. Based on the received training sequence, the originating Com_DEV may compute channel estimates, CSI, gain values and/or SNR values and/or determine one or more MCS. The originating Com_DEV may communicate to the destination Com_DEV at least a portion of the computed channel estimates, CSI, gain values and/or SNR values and/or determined one or more MCS. The destination Com_DEV may utilize the received channel estimates, CSI, gain values and/or SNR values and/or determined MCS to generate a precoding matrix. The destination Com_DEV may utilize the precoding matrix to generate a plurality of transmit chain signals, which may be concurrently transmitted via a corresponding plurality of transmitting antennas during the beamformed data transmission period 424.

A Com_DEV, which supports beamformed signal transmission, may utilize computed channel estimates, CSI, gain values and/or SNR values and/or determined MCS in addition to received channel estimates, CSI, gain values and/or SNR values and/or determined MCS to generate a channel equalization matrix. The Com_DEV may utilize the channel equalization matrix to enable reception and decoding of beamformed signals during the beamformed data transmission period 424.

For example, referring to FIG. 1, the PNC 102 may assign beamformed CTA_1 time slot 412 for communication between the DEV 122 and the DEV 126. During the CTA_1 time slot 412, the DEV 122 and the DEV 126 may exchange training sequences and/or CSI during the training and CSI exchange period 422. The DEV 122 and/or the DEV 126 may transmit and/or receive beamformed signals during the beamformed data transmission period 424.

In various embodiments of the invention, the training and CSI exchange between Com_DEVs may be performed in each superframe, once in every Z superframes or once in a variable number of superframes. In instances in which the training and CSI exchange is performed once in every Z superframes the Com_DEVs engaged in communication may determine the value Z. The C_Com_DEV may communicate the value Z within a transmitted beacon frame 202. The Com_DEVs engaged in a communication may each compute channel estimates based on signals received during the communication. In such case, a Com_DEV may initiate a training and CSI exchange based on changes in computed channel estimates and/or CSI, which may occur dynamically during the communication. In instances in which a training and CSI exchange is not performed in each superframe and/or assigned CTA time slot, Com_DEVs may utilize information generated during the most recent training and CSI exchange.

Figure 6:
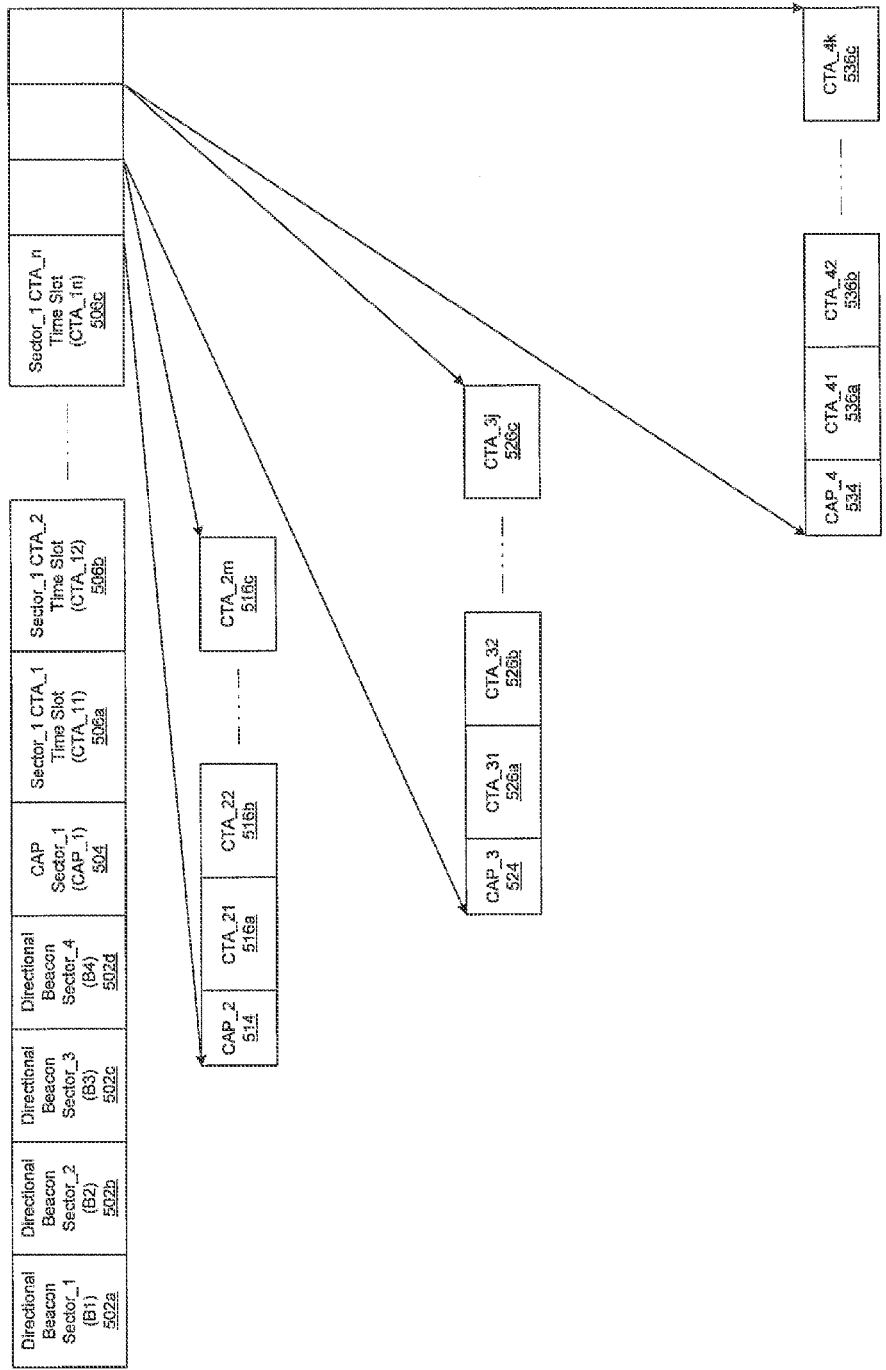
FIG. 6 is a diagram of an exemplary superframe structure for directional signal transmission and reception, in accordance with an embodiment of the invention.

FIG. 6 is a diagram of an exemplary superframe structure for directional signal transmission and reception, in accordance with an embodiment of the invention. FIG. 6 presents an exemplary superframe structure for a coordinating communication device (C_Com_DEV), which utilizes directional signal transmission and/or signal reception in four sectors. However, various embodiments of the invention may be practiced when the number of sectors is greater than four or less than four. Referring to FIG. 6, there is shown a plurality of directionally transmitted beacon frames: a directional beacon frame transmitted in Sector_1 (B1 ) 502a, a directional beacon frame transmitted in Sector_2 (B2) 502b, a directional beacon frame transmitted in Sector_3 (B3) 502c and a directional beacon frame transmitted in Sector_4 (B4) 502d. Also shown in FIG. 6 is a CAP, which may be utilized for communications by the Com_DEVs within Sector_1 (CAP_1) 504 and a plurality of CTA time slots for communications within Sector_1: Sector_1 CTA_1 time slot ($CTA_{11\ 506}a$, Sector_1 CTA_2 time slot (CTA_12) 506b, ..., and Sector_1 CTA_n time slot (CTA_1n) 506c, where n represents the number of CTA time slots, which may be utilized for communications by Com_DEVs within Sector_1. Also shown in FIG. 6 is a CAP, which may be utilized for communications by the Com_DEVs within Sector_2 (CAP_2) 514 and a plurality of CTA time slots for communications within Sector_2: Sector_2 CTA_1 time slot (CTA_21) 516a, Sector_2 CTA_2 time slot (CTA_22) 516b, ..., and Sector_2 CTA_m time slot (CTA_2m) 516c, where m represents the number of CTA time slots for communications within Sector_2. Also shown in FIG. 6 is a CAP, which may be utilized for communications by the Com_DEVs within Sector_3 (CAP_3) 524 and a plurality of CTA time slots for communications within Sector_3: Sector_3 CTA_1 time slot (CTA_31) 526a, Sector_3 CTA_2 time slot (CTA_32) 526b, ..., and Sector_3 CTA_j time slot (CTA_3j) 526c, where j represents the number of CTA time slots for communications within Sector_3. Also shown in FIG. 6 is a CAP, which may be utilized for communications by the Com_DEVs within Sector_4 (CAP_4) 534 and a plurality of CTA time slots for communications within Sector_4: Sector_4 CTA_1 time slot (CTA_41) 536a, Sector_4 CTA_2 time slot (CTA_42) 536b, ..., and Sector_4 CTA_k time slot (CTA_4m) 516c, where m represents the number of CTA time slots for communications within Sector_m.

The beacon frame B1 502a, CAP_1 504 and the plurality of CTA time slots CTA_11 506a, CTA_12 506b, ..., and CTA_1n 506c comprise a superframe for the Com_DEVs that are physically located within Sector_1. This superframe may be referred to as a sector superframe. The beacon frame B2 502b, CAP_2 514 and the plurality of CTA time slots CTA_21 516a, CTA_22 516b, ..., and CTA_2 m 516c comprise a sector superframe for the Com_DEVs that are physically located within Sector_2. The beacon frame B3 502c, CAP_3 524 and the plurality of CTA time slots CTA_31 526a, CTA_32 526b, ..., and CTA_3j 526c comprise a sector superframe for the Com_DEVs that are physically located within Sector_3. The beacon frame B4 502d, CAP_4 534 and the plurality of CTA time slots CTA_41 536a, CTA_42 536b, ..., and CTA_4k 536c comprise a sector superframe for the Com_DEVs that are physically located within Sector_1.

Referring to FIG. 1, the PNC 102 may transmit directional beacon B1 502a by utilizing one or more directional antennas that transmit signals in the direction of Sector_1. The directional beacon B1 502a may comprise information that is substantially to that transmitted in beacon frame 202. The beacon B1 502a may indicate beginning and ending time instants for the CAP_1 504. In addition, the beacon B1 502a may indicate a beginning time instant for transmission of a subsequent beacon B1 502a. The beacon B1 502a may also comprise a set of time slot assignments for the plurality of n time slots CTA_11 506a, CTA_12 506b, ..., and CTA_1n 506c. The transmitted beacon B1 502a may be received by the Com_DEVs that are physically located within Sector_1, for example the DEV 112, the DEV 114 and/or the DEV 116. The PNC 102 may communicate neighborhood map information to Com_DEVs that are physically located within Sector_1 (for example, DEV 112, DEV 114 and DEV 116) via the beacon B1 502a.

During CAP_1 504, receiving antennas located at the PNC 102 may be operable to receive signals for a range of AOA values that fall within Sector_1. For example, the PNC 102 may receive signals from the DEV 112, the DEV 114 and/or the DEV 116. The PNC 102 may receive communications related to association and/or authentication from the DEV 112, the DEV 114 and/or the DEV 116, for example. The PNC 102 may also receive time slot allocation requests from the DEV 112, the DEV 114 and/or the DEV 116, for example. The PNC 102 may also receive neighborhood map information from the DEV 112, the DEV 114 and/or the DEV 116.

During each of the CTA time slots CTA_11 506a, CTA_12 506b, ..., and CTA_1n 506c one or more Com_DEVs that are physically located within Sector_1 may transmit and/or receive signals via the wireless communication medium. Referring to FIG. 1, each of the plurality of CTA time slots CTA_11 506a, CTA_12 506b, ..., and CTA_1n 506c may be assigned to the DEV 112, the DEV 114 and/or the DEV 116. The PNC 102 may assign each of the plurality of CTA time slots CTA_11 506a, CTA_12 506b, ..., and CTA_1n 506c based on neighborhood map information.

Again referring to FIG. 1, the PNC 102 may transmit directional beacon B2 502b by utilizing one or more directional antennas that transmit signals in the direction of Sector_2. The directional beacon B2 502b may comprise information that is substantially to that transmitted in beacon frame B1 502a. The beacon B2 502b may indicate beginning and ending time instants for the CAP_2 514. In addition, the beacon B2 502b may indicate a beginning time instant for transmission of a subsequent beacon B2 502b. The beacon B2 502b may also comprise a set of time slot assignments for the plurality of m time slots CTA_21 516a, CTA_22 516b, ..., and CTA_2m 516c. The transmitted beacon B2 502b may be received by the Com_DEVs that are physically located within Sector_2, for example the DEV 118 and/or the DEV 120. The PNC 102 may communicate neighborhood map information to the DEV 118 and/or the DEV 120 via the beacon B2 502b.

During CAP_2 514, receiving antennas located at the PNC 102 may be operable to receive signals for a range of AOA values that fall within Sector_2. For example, the PNC 102 may receive signals from the DEV 118 and/or the DEV 120. During each of the CTA time slots CTA_21 516a, CTA_22 516b, ..., and CTA_2m 516c, the DEV 118 and/or the DEV 120 may transmit and/or receive signals via the wireless communication medium. The PNC 102 may assign each of the plurality of CTA time slots CTA_21 516a, CTA_22 516b, ..., and CTA_2m 516c based on neighborhood map information.

The PNC 102 may transmit directional beacon B3 502c by utilizing one or more directional antennas that transmit signals in the direction of Sector_3. The directional beacon B3 502c may comprise information that is substantially to that transmitted in beacon frame B1 502a. The beacon B3 502c may indicate beginning and ending time instants for the CAP_3 524. In addition, the beacon B3 502c may indicate a beginning time instant for transmission of a subsequent beacon B3 502c. The beacon B3 502c may also comprise a set of time slot assignments for the plurality of m time slots CTA_31 526a, CTA_32 526b, ..., and CTA_3j 526c. The transmitted beacon B3 502c may be received by the Com_DEVs that are physically located within Sector_3, for example the DEV 122, the DEV 124, the DEV 126 and/or the DEV 128. The PNC 102 may communicate neighborhood map information to the DEV 122, the DEV 124, the DEV 126 and/or the DEV 128 via the beacon B3 502c.

During CAP_3 524, receiving antennas located at the PNC 102 may be operable to receive signals for a range of AOA values that fall within Sector_3. For example, the PNC 102 may receive signals from the DEV 122, the DEV 124, the DEV 126 and/or the DEV 128. During each of the CTA time slots CTA_31 526a, CTA_32 526b, . . . , and CTA_3j 526c, the DEV 122, the DEV 124, the DEV 126 and/or the DEV 128 may transmit and/or receive signals via the wireless communication medium. The PNC 102 may assign each of the plurality of CTA time slots CTA_31 526a, CTA_32 526b, . . . , and CTA_3j 526c based on neighborhood map information.

The PNC 102 may transmit directional beacon B4 502d by utilizing one or more directional antennas that transmit signals in the direction of Sector_4. The directional beacon B4 502d may comprise information that is substantially to that transmitted in beacon frame B1 502a. The beacon B4 502d may indicate beginning and ending time instants for the CAP_4 534. In addition, the beacon B4 502d may indicate a beginning time instant for transmission of a subsequent beacon B4 502d. The beacon B4 502d may also comprise a set of time slot assignments for the plurality of m time slots CTA_$_{41\ 536}$a, CTA_42 536b, . . . , and CTA_4k 536c. The transmitted beacon B4 502d may be received by the Com_DEVs that are physically located within Sector_4, for example the DEV 130 and/or the DEV 132. The PNC 102 may communicate neighborhood map information to the DEV 130 and/or the DEV 132 via the beacon B4 502d.

During CAP_4 534, receiving antennas located at the PNC 102 may be operable to receive signals for a range of AOA values that fall within Sector_4. For example, the PNC 102 may receive signals from the DEV 130 and/or the DEV 132. During each of the CTA time slots CTA_41 536a, CTA_42 536b, . . . , and CTA_4k 536c, the DEV 130 and/or the DEV 132 may transmit and/or receive signals via the wireless communication medium. The PNC 102 may assign each of the plurality of CTA time slots CTA_41 536a, CTA_42 536b, . . . , and CTA_4k 536c based on neighborhood map information.

In operation, the PNC 102 may transmit beacon B1 502a in the Sector_1 direction, the PNC 102 may then transmit beacon B2 502b in the Sector_2 direction, followed by transmitting beacon B3 502c in the Sector_3 direction and beacon B4 502d in the Sector_4 direction. The PNC 102 may then utilize directional receiving antennas to listen for signals received from the Sector_1 direction during CAP_1 504, the PNC 102 may then utilize directional receiving antennas to listen for signals received from the Sector_2 direction during CAP_2 514, followed by listening for signals received from the Sector_3 direction during CAP_3 524 and for signals received from the Sector_4 direction during CAP_4 534.

In general, a coordinating communication device (C_Com_DEV) may transmit a plurality of T sector superframes to each corresponding one of a plurality of T sectors. Thus, a Com_DEV, which has been activated within Sector_1 at a time instant following the transmission by the C_Com_DEV of beacon frame B1 502a may have to wait for a time duration of approximately T×MaxSuperFrameDuration to receive the next beacon frame B1 502a that is transmitted by the C_Com_DEV.

Figure 7:
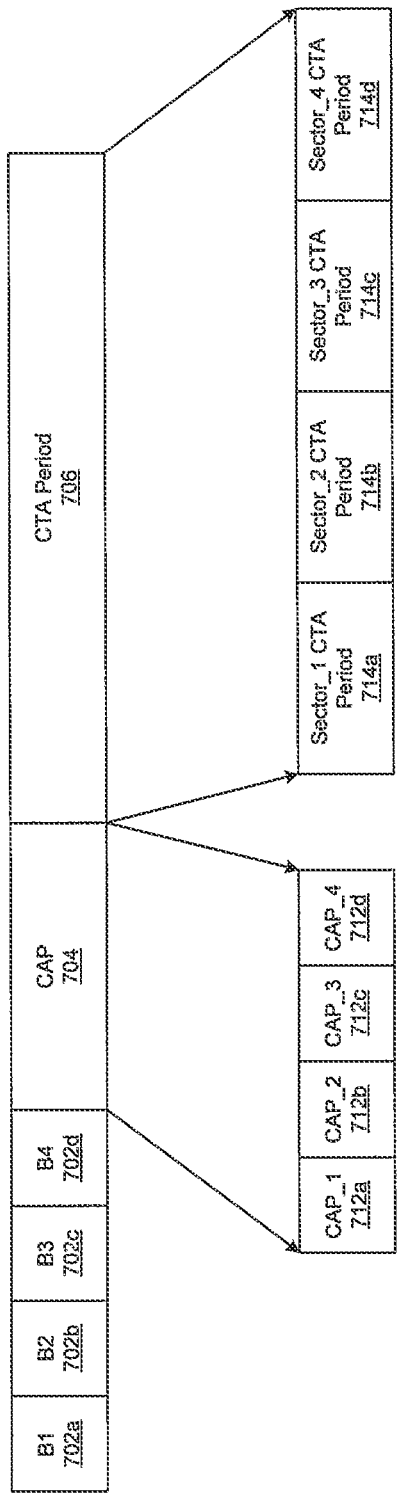
FIG. 7 is a diagram of an exemplary superframe structure for directional signal transmission and reception, in accordance with an embodiment of the invention.

FIG. 7 is a diagram of an exemplary superframe structure for directional signal transmission and reception, in accordance with an embodiment of the invention. Referring to FIG. 7, there is shown a Sector_1 beacon frame (B1) 702a, a Sector_2 beacon frame (B2) 702b, a Sector_3 beacon frame (B3) 702c and a Sector_4 beacon frame (B4) 702d. Also shown in FIG. 7 are a CAP 704 and a CTA period 706. The CAP 704 comprises a Sector_1 CAP (CAP_1) 712a, a Sector_2 CAP (CAP_2) 712b, a Sector_3 CAP (CAP_3) 712c and a Sector_4 CAP (CAP_4) 712d. The CTA period 706 comprises a Sector_1 CTA period 714a, a Sector_2 CTA period 714b, a Sector_3 CTA period 714c and a Sector_4 CTA period 714d.

Comparing FIG. 6 and FIG. 7 with reference to FIG. 1, in FIG. 7, a PNC 102 may transmit beacon frame B1 702a in the Sector_1 direction, B2 702b in the Sector_2 direction, B3 702c in the Sector_3 direction and B4 702d in the Sector_4 direction as described above with regard to beacon frames B1 502a, B2 502b, B3 502c and B4 502d. After transmitting beacon frame B4 702d, the PNC 102 may listen for signals received from the Sector_1 direction during CAP_1 712a, listen for signals received from the Sector_2 direction during CAP_2 712b, then listen for signals received from the Sector_3 direction during CAP_3 712c and listen for signals received from the Sector_4 direction during CAP_4 712d.

The Sector_1 CTA period 714a comprises one or more CTA time slots, which may be utilized for communications by the DEV 112, the DEV 114 and/or the DEV 116, for example. The Sector_2 CTA period 714b comprises one or more CTA time slots, which may be utilized for communications by the DEV 118 and/or the DEV 120, for example. The Sector_3 CTA period 714c comprises one or more CTA time slots, which may be utilized for communications by the DEV 122, the DEV 124, the DEV 126 and/or the DEV 128, for example. The Sector_4 CTA period 714d comprises one or more CTA time slots, which may be utilized for communications by the DEV 130 and/or the DEV 132, for example.

FIG. 8 is a diagram of an exemplary superframe structure for directional signal transmission and reception, in accordance with an embodiment of the invention. Referring to FIG. 8, there is shown a Sector_1 beacon frame (B1) 802, a Sector_1 CAP (CAP_1) 804, a Sector_1 CTA period 806, a Sector_2 beacon frame (B2) 808, a Sector_2 CAP (CAP_2) 810, a Sector_2 CTA period 812, a Sector_3 beacon frame (B3) 814, a Sector_3 CAP (CAP_3) 816, a Sector_3 CTA period 818, a Sector_4 beacon frame (B4) 820, a Sector_4 CAP (CAP_4) 822 and a Sector_4 CTA period 824.

Comparing FIG. 6 and FIG. 8 with reference to FIG. 1, in FIG. 8, a PNC 102 may transmit beacon frame B1 802 in the Sector_1 direction. After transmitting the beacon frame B1 802, the PNC 102 may listen for signals received from the Sector_1 direction during CAP_1 804. The Sector_1 CTA period 806 comprises one or more CTA time slots, which may be utilized for communications by the DEV 112, the DEV 114 and/or the DEV 116, for example.

Following the Sector_1 CTA period 806, the PNC 102 may transmit beacon frame B2 808 in the Sector_2 direction. After transmitting the beacon frame B2 808, the PNC 102 may listen for signals received from the Sector_2 direction during CAP_2 810. The Sector_2 CTA period 812 comprises one or more CTA time slots, which may be utilized for communications by DEV 118 and/or DEV 120, for example.

Following the Sector_2 CTA period 812, the PNC 102 may transmit beacon frame B3 814 in the Sector_3 direction. After transmitting the beacon frame B3 814, the PNC 102 may listen for signals received from the Sector_3 direction during CAP_3 816. The Sector_3 CTA period 818 comprises one or more CTA time slots, which may be utilized for communications by the DEV 122, the DEV 124, the DEV 126 and/or the DEV 128, for example.

Following the Sector_3 CTA period 818, the PNC 102 may transmit beacon frame B4 820 in the Sector_4 direction. After transmitting the beacon frame B4 820, the PNC 102 may listen for signals received from the Sector_4 direction during CAP_4 822. The Sector_4 CTA period 824 comprises one or more CTA time slots, which may be utilized for communications by the DEV 130 and/or the DEV 132, for example.

During a contention access period (CAP) Com_DEVs may attempt to participate in communication via a wireless communication medium. Prior to engaging in communication, an originating Com_DEV may attempt to access the wireless communication medium by transmitting an RTS frame. The RTS frame may identify the originating Com_DEV and one or more destination Com_DEVs. The transmitted RTS informs recipient Com_DEVs that the originating Com_DEV is requesting access to the wireless communication medium. In instances in which the recipient Com_DEV is a destination Com_DEV as identified in the RTS frame, the recipient Com_DEV may respond by transmitting a CTS frame to the originating Com_DEV.

The originating Com_DEV may also transmit a training sequence that comprises a series of training pulses. The transmitted training pulses may enable a recipient Com_DEV to compute one or more channel estimates and/or channel state information (CSI) that characterize the RF communication channel in the direction from the originating Com_DEV to the recipient Com_DEV. Similarly, a recipient Com_DEV may transmit a sequence of training pulses to the originating Com_DEV. The transmitted training pulses may enable the originating Com_DEV to compute one or more channel estimates and/or CSI that characterize the RF communication channel in the direction form the destination Com_DEV to the originating Com_DEV.

In various embodiments of the invention, the Com_DEVs may determine the starting time instant and time duration for a CAP based on a received beacon frame. RTS frames may be transmitted utilizing omnidirectional or directional signal transmission. The CTS frames may be transmitted utilizing omnidirectional or directional signal transmission. The training pulses may be transmitted utilizing omnidirectional or directional signal transmission. After completion of the RTS/CTS exchange and/or subsequent to computation of channel estimates and/or CSI, the originating Com_DEV and destination Com_DEV(s) may communicate during the CAP.

Figure 9:
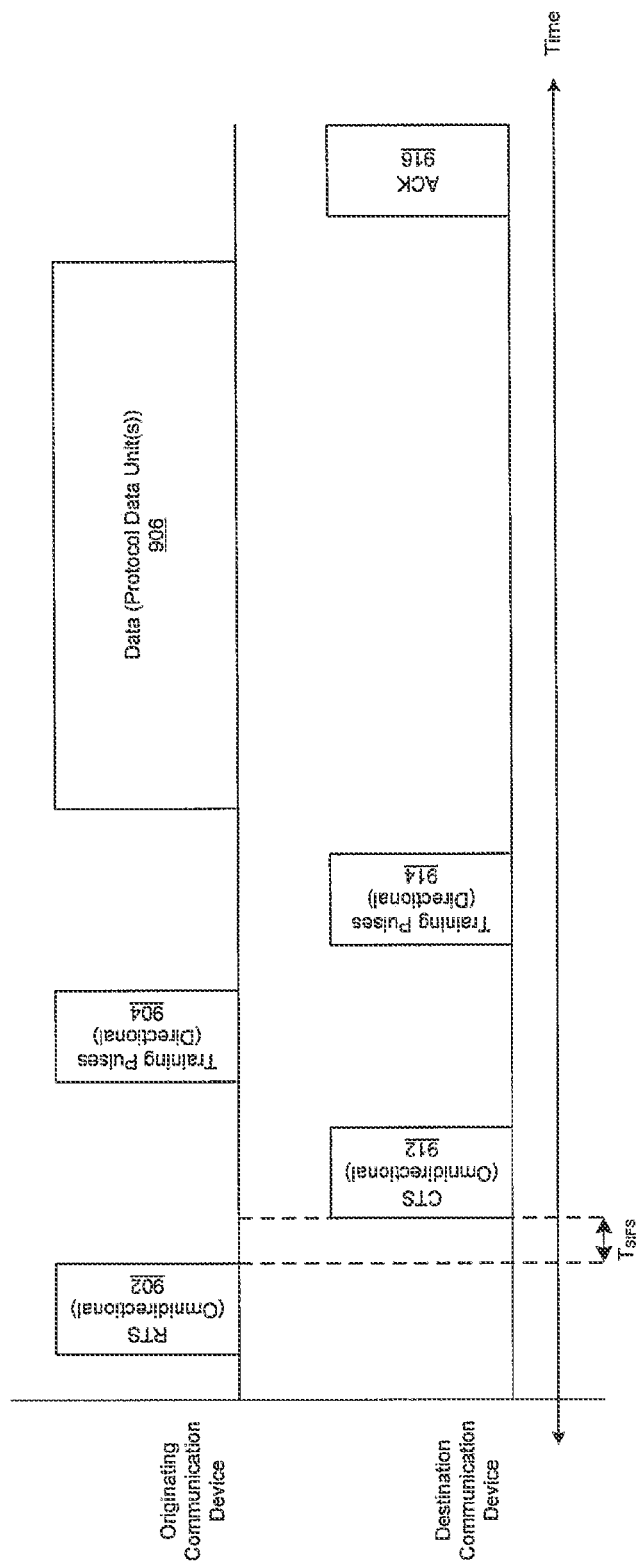
FIG. 9 is a diagram that illustrates an exemplary asynchronous communication sequence, in accordance with an embodiment of the invention.

FIG. 9 is a diagram that illustrates an exemplary asynchronous communication sequence, in accordance with an embodiment of the invention. Referring to FIG. 9, there is shown an RTS frame 902 that is transmitted by an originating Com_DEV utilizing omnidirectional signal transmission. Upon receipt of the RTS frame 902 a destination Com_DEV may transmit a CTS frame 912 utilizing omnidirectional signal transmission. The time duration that begins when the destination Com_DEV receives the RTS frame 902 and ends when the destination Com_DEV transmits the CTS frame 912 may be referred to as an interframe space (IFS) time interval. In various embodiments of the invention, the IFS time interval may comprise a short IFS (SIFS), point coordination function IFS (PIFS) or extended IFS (EIFS), for example.

Subsequent to receipt of the CTS frame 912, the originating Com_DEV may transmit a sequence of training pulses 904 utilizing directional signal transmission. The originating Com_DEV may, for example, utilize a plurality of receiving antennas that are operable for directional signal reception to determine an AOA for the received CTS frame 912. Based on the determined AOA, the origination Com_DEV may determine a direction for transmission of the training pulse sequence 904. Subsequent to receipt of the training pulse sequence 904, the destination Com_DEV may transmit a sequence of training pulses 914 utilizing directional signal transmission.

Subsequent to receipt of the training pulse sequence 914, the originating Com_DEV may transmit one or more protocol data units (PDUs), for example data 906, to the destination Com_DEV via the wireless communication medium. The destination Com_DEV may indicate successful reception of the data 906 by transmitting an acknowledgment PDU 916 to the originating Com_DEV.

Referring to FIG. 1, in an exemplary embodiment of the invention an originating Com_DEV, DEV 112, may communicate data 906 to a destination Com_DEV, DEV 114 by utilizing the asynchronous communication sequence presented in FIG. 9.

Figure 10:
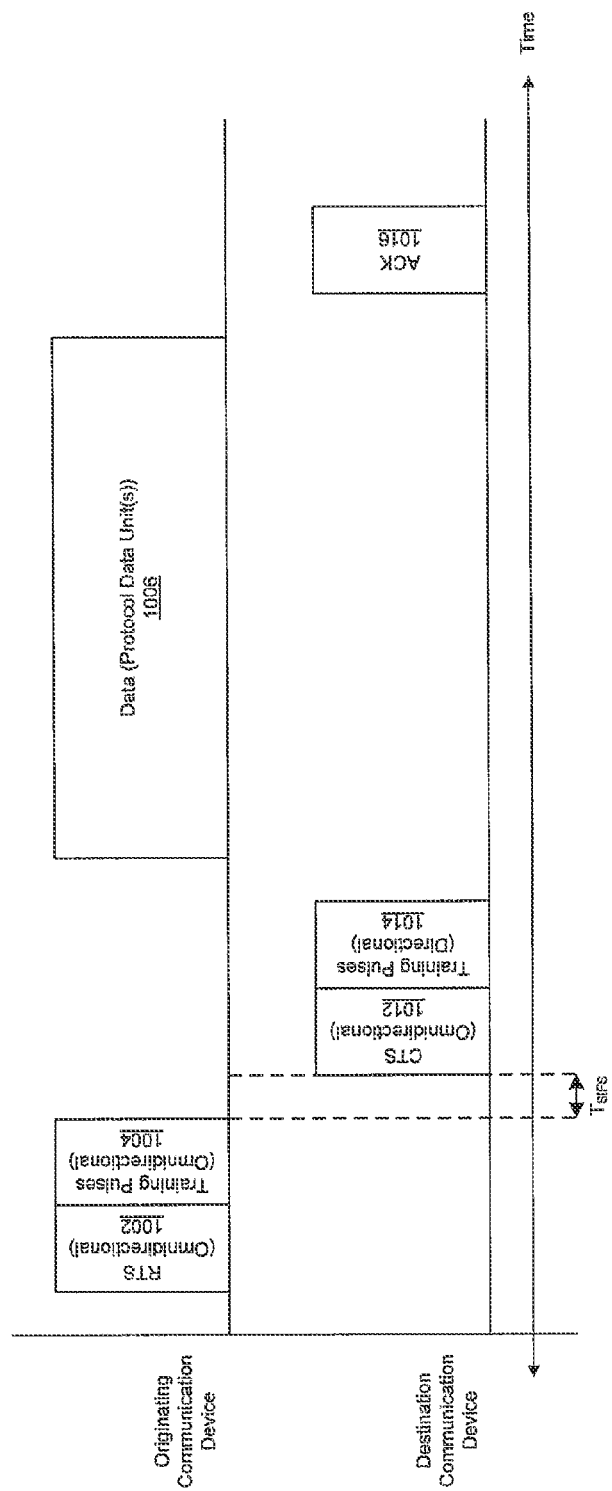
FIG. 10 is a diagram that illustrates an exemplary asynchronous communication sequence, in accordance with an embodiment of the invention.

FIG. 10 is a diagram that illustrates an exemplary asynchronous communication sequence, in accordance with an embodiment of the invention. Referring to FIG. 10, there is shown an RTS frame 1002 that is transmitted by an originating Com_DEV utilizing omnidirectional signal transmission. In addition, a sequence of training pulses 1004 may also be transmitted utilizing omnidirectional signal transmission. Upon receipt of the RTS frame 1002 and training pulses 1004, a destination Com_DEV may transmit a CTS frame 1012 utilizing omnidirectional signal transmission. In addition, a sequence of training pulses 1014 may be transmitted utilizing directional signal transmission.

Subsequent to receipt of the training pulse sequence 1014, the originating Com_DEV may transmit data 1006, to the destination Com_DEV via the wireless communication medium. The destination Com_DEV may indicate successful reception of the data 1006 by transmitting an acknowledgment PDU 1016 to the originating Com_DEV.

Referring to FIG. 1, in an exemplary embodiment of the invention an originating Com_DEV, DEV 112, may communicate data 1006 to a destination Com_DEV, DEV 114 by utilizing the asynchronous communication sequence presented in FIG. 10.

Figure 11:
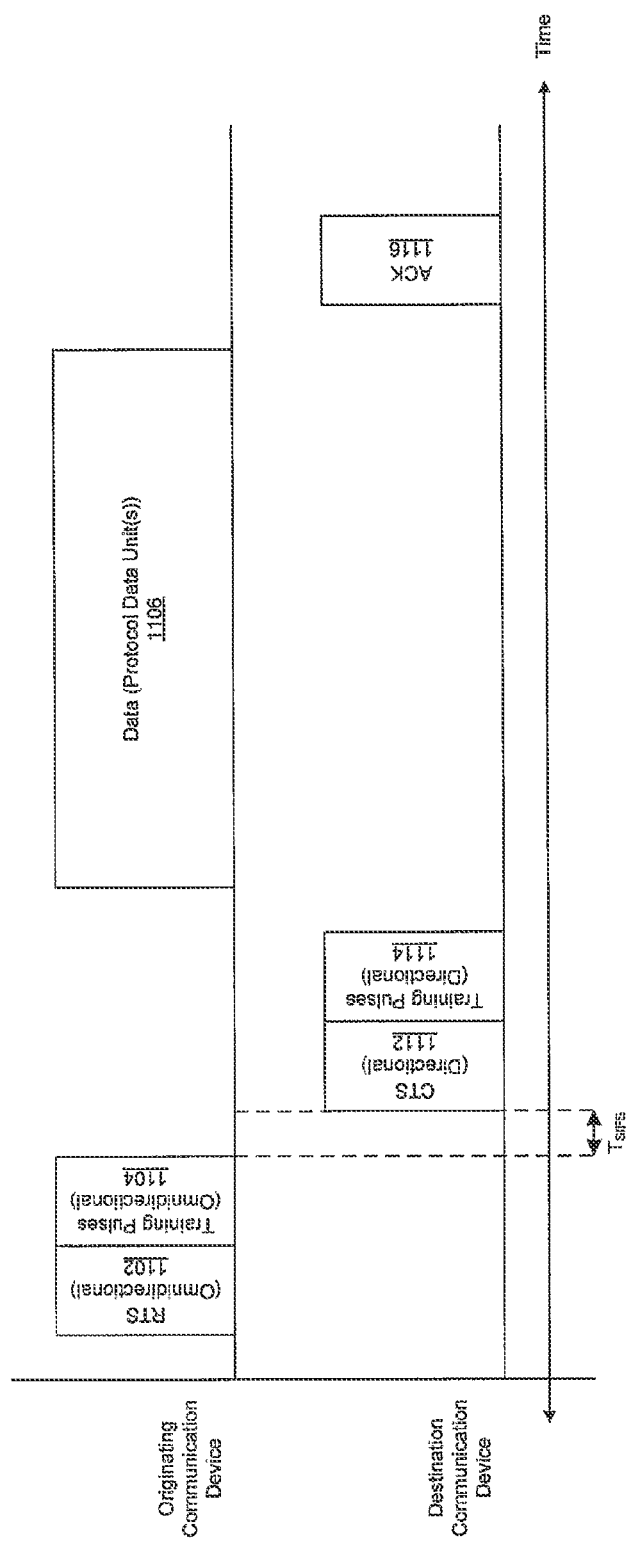
FIG. 11 is a diagram that illustrates an exemplary asynchronous communication sequence, in accordance with an embodiment of the invention.

FIG. 11 is a diagram that illustrates an exemplary asynchronous communication sequence, in accordance with an embodiment of the invention. Referring to FIG. 11, there is shown an RTS frame 1102 that is transmitted by an originating Com_DEV utilizing omnidirectional signal transmission. In addition, a sequence of training pulses 1104 may also be transmitted utilizing omnidirectional signal transmission. Upon receipt of the RTS frame 1102 and training pulses 1104, a destination Com_DEV may transmit a CTS frame 1112 utilizing directional signal transmission. In addition, a sequence of training pulses 1114 may also be transmitted utilizing directional signal transmission.

Subsequent to receipt of the training pulse sequence 1114, the originating Com_DEV may transmit data 1106, to the destination Com_DEV via the wireless communication medium. The destination Com_DEV may indicate successful reception of the data 1106 by transmitting an acknowledgment PDU 1116 to the originating Com_DEV.

Referring to FIG. 1, in an exemplary embodiment of the invention an originating Com_DEV, DEV 112, may communicate data 1106 to a destination Com_DEV, DEV 114 by utilizing the asynchronous communication sequence presented in FIG. 11.

Figure 12:
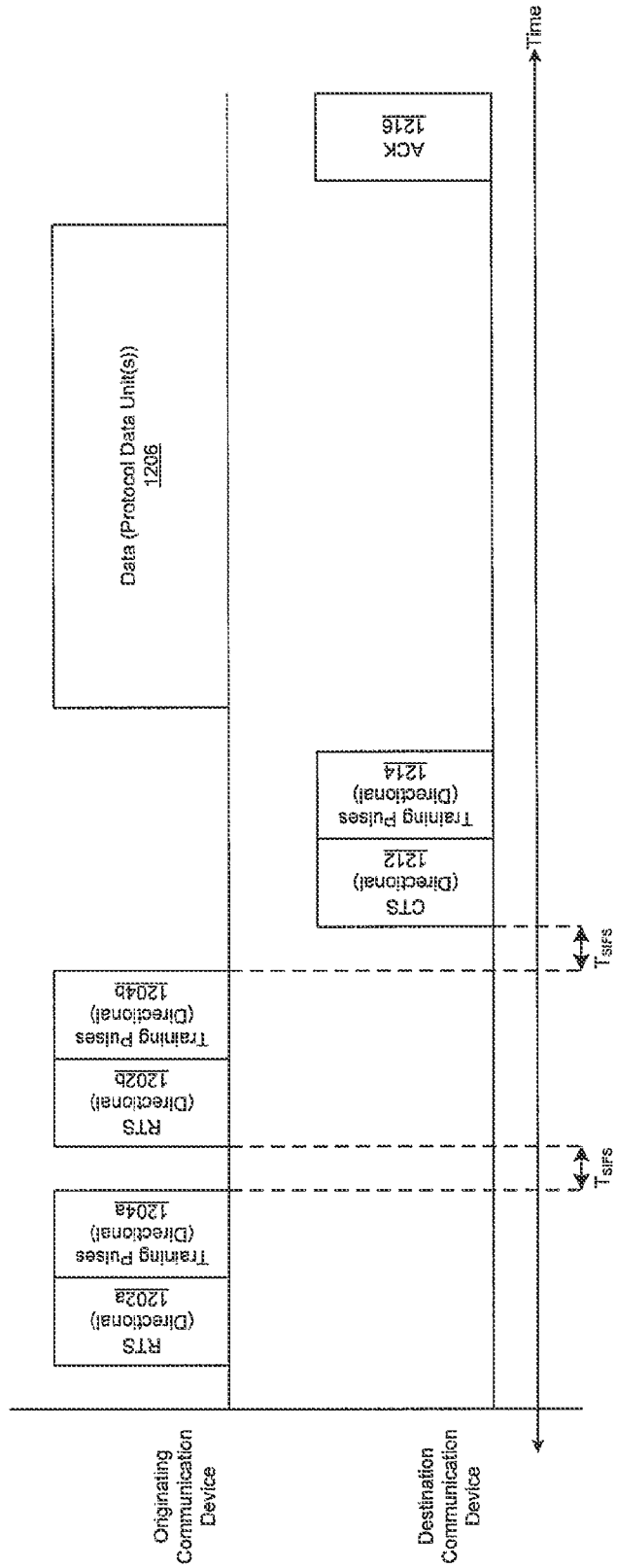
FIG. 12 is a diagram that illustrates an exemplary asynchronous communication sequence, in accordance with an embodiment of the invention.

FIG. 12 is a diagram that illustrates an exemplary asynchronous communication sequence, in accordance with an embodiment of the invention. Referring to FIG. 12, there is shown an RTS frame 1202a that is transmitted by an originating Com_DEV utilizing directional signal transmission. In an exemplary embodiment of the invention, a 360° arc surrounding originating Com_DEV may be divided into a plurality of V sectors. The originating Com_DEV may utilize a plurality of transmitting antennas and/or receiving antennas that are operable for sectorized signal transmission and/or reception in each of the plurality of V sectors. In an exemplary embodiment of the invention, in which the originating Com_

DEV has not determined a physical location for the destination Com_DEV, the RTS frame 1202*a* may be transmitted in the direction of a selected sector, which is the first of the plurality of V sectors. In an exemplary embodiment of the invention, in which the originating Com_DEV may utilize neighborhood map information, the selected sector may be determined based on the neighborhood map information.

In addition, a sequence of training pulses 1204*a* may also be transmitted to the selected sector utilizing directional signal transmission. The originating Com_DEV may utilize one or more receiving antennas to listen for a received CTS frame in response to the transmitted RTS frame 1202*a*. In an exemplary embodiment of the invention, the originating Com_DEV may listen for a determined time duration, for example a SIFS time duration, $T_{SIFS}$.

In instances in which the originating Com_DEV does not receive a CTS frame in response to the transmitted RTS frame 1202*a*, the originating Com_DEV may transmit an RTS frame 1202*b* in the direction of a subsequent selected sector utilizing directional signal transmission. In addition, a sequence of training pulses 1204*b* may also be transmitted to the subsequent selected sector utilizing directional signal transmission.

Upon receipt of the RTS frame 1202*b* and training pulses 1204*b*, a destination Com_DEV may transmit a CTS frame 1212 utilizing directional signal transmission. In addition, a sequence of training pulses 1214 may also be transmitted utilizing directional signal transmission.

Subsequent to receipt of the training pulse sequence 1214, the originating Com_DEV may transmit data 1206, to the destination Com_DEV via the wireless communication medium. The destination Com_DEV may indicate successful reception of the data 1206 by transmitting an acknowledgment PDU 1216 to the originating Com_DEV.

Referring to FIG. 1, the PNC 102 is an exemplary communication device, which may be operable for V=4 sector directional signal transmission and/or reception.

Figure 13:
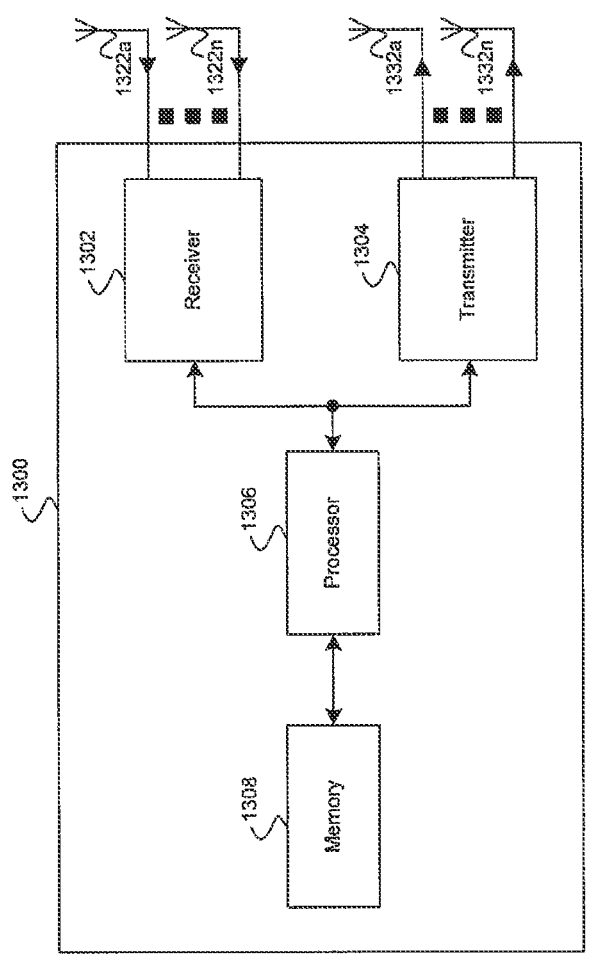
FIG. 13 is an exemplary transceiver comprising a plurality of transmitting antennas and a plurality of receiving antennas, which may be utilized in connection with an embodiment of the invention.

FIG. 13 is an exemplary transceiver comprising a plurality of transmitting antennas and a plurality of receiving antennas, which may be utilized in connection with an embodiment of the invention. Referring to FIG. 13, there is shown a transceiver system 1300, a plurality of receiving antennas 1322*a* . . . 1322*n* and a plurality of transmitting antennas 1332*a* . . . 1332*n*. The transceiver system 1300 may be exemplary of the PNC 102 and/or of any of the DEVs 112, 114, 116, 118, 120, 122, 124, 126, 128, 130 and/or 132. The transceiver system 1300 may comprise at least a receiver 1302, a transmitter 1304, a processor 1306, and a memory 1308. Although a transceiver is shown in FIG. 13, transmit and receive functions may be separately implemented.

The receiver 1302 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 1322*a*, . . . , 1322*n*. The data may be communicated to the processor 1306.

The transmitter 1304 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 1306. The RF signals may be transmitted via one or more transmitting antennas 1332*a* . . . 1332*n*.

In various embodiments of the invention, one or more of the receiving antennas 1322*a* . . . 1322*n* may be operable for directional and/or omnidirectional reception of signals. One or more of the transmitting antennas 1332*a* . . . 1332*n* may be operable for directional and/or omnidirectional transmission of signals.

The memory 1308 may comprise suitable logic, circuitry, interfaces and/or code that may enable storage and/or retrieval of data and/or code. The memory 1308 may utilize any of a plurality of storage medium technologies, such as volatile memory, for example random access memory (RAM), and/or non-volatile memory, for example electrically erasable programmable read only memory (EEPROM). In the context of the present application, the memory 1308 may enable storage of code for the computation and storage of AOA values, channel estimates, CSI, SNR values, gain values, matrices for beamform signal generation and/or reception, CTA scheduling information and/or neighborhood map information for example. The memory 1308 may enable storage of training sequences, time slot request information.

In operation, the processor 1306 may enable the computation of AOA values, channel estimates, CSI, SNR values, gain values, matrices for beamformed signal generation and/or reception, CTA scheduling information and/or neighborhood map information for example. The processor 1306 may enable determination of superframe time durations, beacon frame time durations, CAP time durations, CTA period time durations and/or CTA time slot assignments, for example. The processor 1306 may also enable the transmission and processing of RTS frames, CTS frames, training sequences, data frames comprising neighborhood information and/or the transmission and processing of other PDUs transmitted by the transceiver 300. The processor 1306 may enable selection of transmitting antennas 1332*a* . . . 1332*n* and/or receiving antennas 1322*a* . . . 1322*n* for sectorized signal transmission and/or reception.

Figure 14:
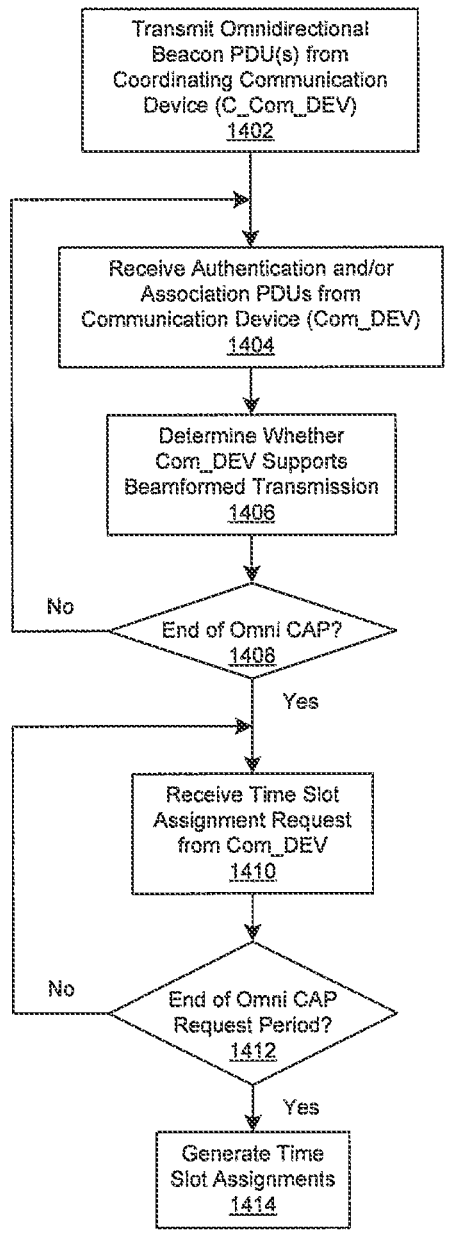
FIG. 14 is a flowchart that illustrates exemplary steps for generation of time slot assignments in a superframe structure for omnidirectional signal transmission and/or reception, in accordance with an embodiment of the invention.

FIG. 14 is a flowchart that illustrates exemplary steps for generation of time slot assignments in a superframe structure for omnidirectional signal transmission and/or reception, in accordance with an embodiment of the invention. Referring to FIG. 14, in step 1402 a coordinating communication device (C_Com_DEV) may transmit an beacon PDU (for example a frame) utilizing omnidirectional signal transmission. In step 1404, the C_Com_DEV may receive authentication and/or association PDUs from one or more communication devices (Com_DEVs). The authentication and/or association PDUs may be received during a contention access period (CAP). During the CAP, the C_Com_DEV may be operable to receive communications by utilizing omnidirectional signal reception and/or transmission. This CAP may be referred to as an omni CAP. The authentication and/or association PDUs may be received from a Com_DEV in response to the transmitted beacon PDU. The authentication and/or association PDUs may comprise requests from the responding Com_DEVs to authenticate and/or associated with the C_Com_DEV in a piconet, for example. In step 1406, the C_Com_DEV may determine whether the responding Com_DEV supports beamformed transmission and/or reception. In step 1408, the C_Com_DEV may determine whether the omni CAP time duration has ended. In instances in which the omni CAP time duration has not ended, step 1404 may follow step 1408.

In instances in which the omni CAP time duration has ended, as determined in step 1408, in step 1410, the C_Com_DEV may receive one or more time slot assignment requests from one or more Com_DEVs. The time slot assignment requests may be received during an omni CAP request period. In step 1412, the C_Com_DEV may determine whether the omni CAP request period time duration has ended. In instances in which the omni CAP request period time duration has not ended, step 1410 may follow step 1412. In instances in which the omni CAP request period time duration has ended, as determined in step 1412, in step 1414, the C_Com_DEV may generate one or more time slot assignments.

Figure 15:
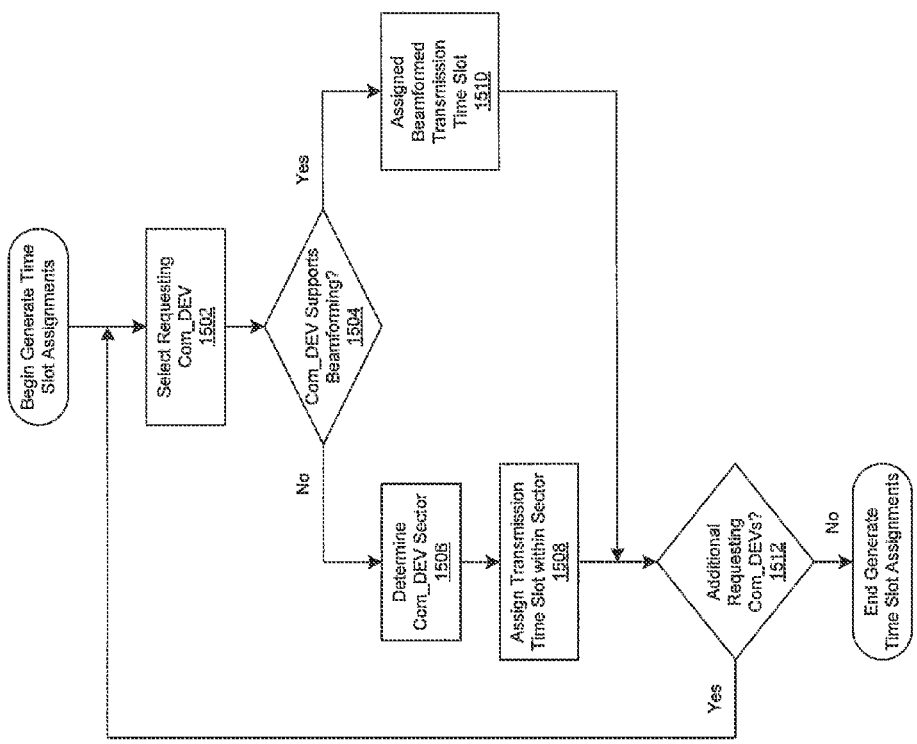
FIG. 15 is a flowchart that illustrates exemplary steps for generation of time slot assignments, in accordance with an embodiment of the invention.

FIG. 15 is a flowchart that illustrates exemplary steps for generation of time slot assignments, in accordance with an embodiment of the invention. Referring to FIG. 15, in step 1502 a C_Com_DEV select a Com_DEV, or requesting Com_DEV, for which there is a current time slot assignment request. In step 1504, the C_Com_DEV may determine whether the requesting Com_DEV supports beamformed transmission and/or reception. In instances in which the selected Com_DEV does not support beamformed signal transmission and/or reception, as determined in step 1504, in step 1506, the C_Com_DEV may determine a sector in which the selected Com_DEV may be physically located. The C_Com_DEV may determine the sector based on an AOA for signals received from the selected Com_DEV and/or based on neighborhood map information. In step 1508, the C_Com_DEV may assign a transmission time slot within the determined sector to the requesting Com_DEV. The assigned transmission time slot may be within a sector CTA period for the determined sector.

In step 1512, the C_Com_DEV may determine whether there are additional Com_DEVs for which there is a current time slot assignment request. In instances in which there are additional Com_DEVs, as determined in step 1512, step 1502 may follow step 1512.

In instances in which the requesting Com_DEV does support beamformed transmission and/or reception, as determined in step 1504, in step 1510, the C_Com_DEV may assign a transmission time slot within a beamformed CTA period. Step 1512 may follow step 1510.

Figure 16:
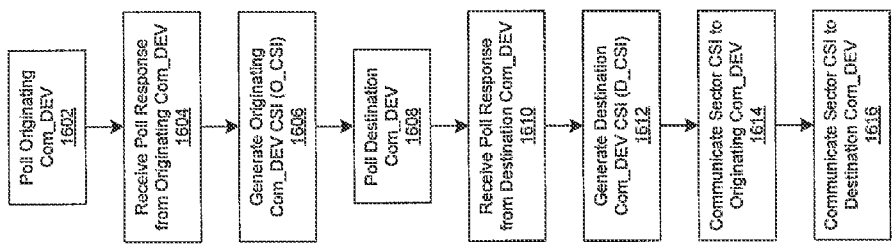
FIG. 16 is a flowchart that illustrates exemplary steps for device polling to support sector communications between communication devices, in accordance with an embodiment of the invention.

FIG. 16 is a flowchart that illustrates exemplary steps for device polling to support sector communications between communication devices, in accordance with an embodiment of the invention. In various embodiments of the invention, prior to communication between an originating Com_DEV and a destination Com_DEV during an assigned sector CTA time slot, a C_Com_DEV may poll the originating Com_DEV and the destination Com_DEV. Referring to FIG. 16, in step 1602, a C_Com_DEV may transmit a poll PDU to an originating Com_DEV. In step 1604, the C_Com_DEV may receive a poll response PDU from the originating Com_DEV. In step 1606, the C_Com_DEV may generate channel estimates and/or channel state information (CSI) for the originating Com_DEV (O_CSI) based on the poll response PDU received from the originating Com_DEV. In step 1608, the C_Com_DEV may poll a destination Com_DEV. In step 1610, the C_Com_DEV may receive a poll response from the destination Com_DEV. In step 1612, the C_Com_DEV may generate channel estimates and/or CSI for the destination Com_DEV (D_CSI) based on the poll response PDU received from the destination Com_DEV. In step 1614, the C_Com_DEV may communicate sector CSI to the originating Com_DEV. The CSI communicated to the originating Com_DEV may be based on the received O_CSI, D_CSI and/or neighborhood map information. In step 1616, the C_Com_DEV may communicate sector CSI to the destination Com_DEV. The CSI communicated to the destination Com_DEV may be based on the received O_CSI, D_CSI and/or neighborhood map information.

Figure 17:
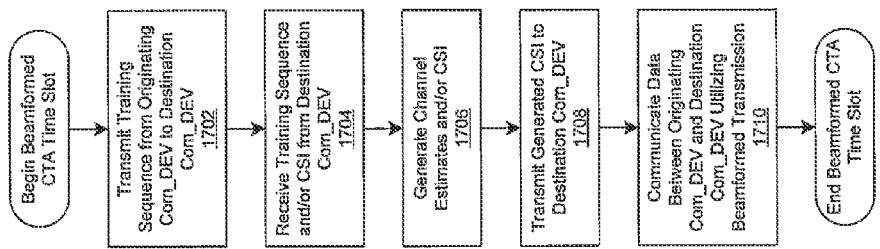
FIG. 17 is a flowchart that illustrates exemplary steps for device training to support beamformed signal transmission and reception between communication devices, in accordance with an embodiment of the invention.

FIG. 17 is a flowchart that illustrates exemplary steps for device training to support beamformed signal transmission and reception between communication devices, in accordance with an embodiment of the invention. In various embodiments of the invention, prior to communication between an originating Com_DEV and a destination Com_DEV during an assigned beamformed CTA time slot, the originating Com_DEV and the destination Com_DEV may exchange training sequences. Based on the training sequence exchange, the originating Com_DEV and the destination Com_DEV may generate precoding and/or equalization matrices that enable communication that utilizes beamformed signal transmission and/or reception. Referring to FIG. 17, in step 1702, an originating Com_DEV may transmit a training sequence to a destination Com_DEV. In step 1704, the originating Com_DEV may receive a training sequence and/or CSI from the destination Com_DEV. The CSI may be computed by the destination Com_DEV based on the training sequence transmitted by the originating Com_DEV in step 1702. In step 1706, the originating Com_DEV may generate channel estimates and/or CSI based on the training sequence received from the destination Com_DEV in step 1704. In step 1708, the originating Com_DEV may transmit the computed channel estimates and/or CSI to the destination Com_DEV. In step 1710, the originating Com_DEV and destination Com_DEV may communicate data and/or PDUs utilizing beamformed signal transmission and/or reception during the assigned beamformed CTA time slot.

Figure 18A:
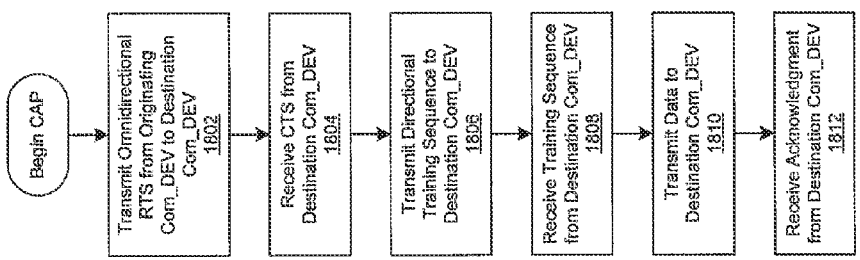
FIG. 18A is a flowchart that illustrates exemplary steps for asynchronous communication utilizing omnidirectional RTS transmission, in accordance with an embodiment of the invention.

FIG. 18A is a flowchart that illustrates exemplary steps for asynchronous communication utilizing omnidirectional RTS transmission, in accordance with an embodiment of the invention. In various embodiments of the invention, the Com DEVs may engage in asynchronous communications during the contention access period (CAP). Referring to FIG. 18A, in step 1802, an originating Com_DEV may transmit an RTS frame utilizing omnidirectional signal transmission. The RTS frame may identify one or more destination Com_DEVs. In step 1804, the originating Com_DEV may receive a CTS frame from a destination Com_DEV. In step 1806, the originating Com_DEV may transmit a training sequence to the destination Com_DEV utilizing directional signal transmission. In step 1808, the originating Com_DEV may receive a training sequence from the destination Com_DEV. In step 1810, the originating Com_DEV may transmit data and/or PDUs to the destination Com_DEV. In step 1812, the originating Com_DEV may receive an acknowledgment (ACK) PDU from the destination Com_DEV. The ACK PDU may correspond to at least a portion of the data and/or PDUs that were transmitted during step 1810.

Figure 18B:
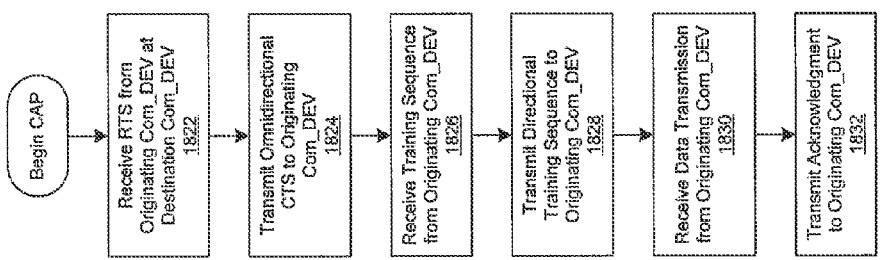
FIG. 18B is a flowchart that illustrates exemplary steps for asynchronous communication utilizing omnidirectional CTS transmission, in accordance with an embodiment of the invention.

FIG. 18B is a flowchart that illustrates exemplary steps for asynchronous communication utilizing omnidirectional CTS transmission, in accordance with an embodiment of the invention. Referring to FIG. 18B, in step 1822, a destination Com_DEV may receive an RTS frame. The RTS frame may identify an originating Com_DEV. In step 1824, the destination Com_DEV may transmit a CTS frame to the originating Com_DEV utilizing omnidirectional signal transmission. In step 1826, the destination Com_DEV may receive a training sequence from the originating Com_DEV. In step 1828, the destination Com_DEV may transmit a training sequence to the originating Com_DEV utilizing directional signal transmission. In step 1830, the destination Com_DEV may receive data and/or PDUs from the originating Com_DEV. In step

1832, the destination Com_DEV may transmit an acknowledgment (ACK) PDU to the originating Com_DEV in response to at least a portion of the received data an/or PDUs.

Figure 19A:
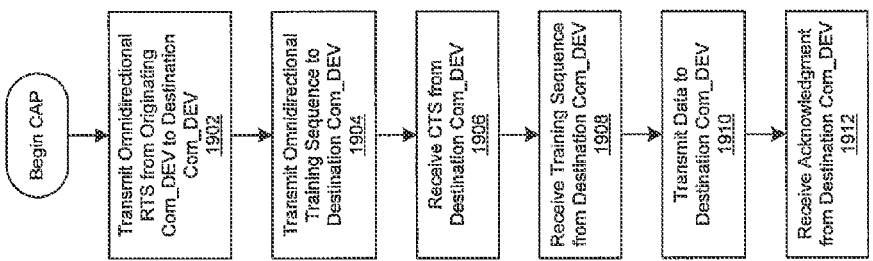
FIG. 19A is a flowchart that illustrates exemplary steps for asynchronous communication utilizing omnidirectional RTS transmission, in accordance with an embodiment of the invention.

FIG. 19A is a flowchart that illustrates exemplary steps for asynchronous communication utilizing omnidirectional RTS transmission, in accordance with an embodiment of the invention. Referring to FIG. 19A, in step 1902, an originating Com_DEV may transmit an RTS frame utilizing omnidirectional signal transmission. The RTS frame may identify one or more destination Com_DEVs. In step 1904, the originating Com_DEV may transmit a training sequence to the destination Com_DEV utilizing omnidirectional signal transmission. In step 1906, the originating Com_DEV may receive a CTS frame from a destination Com_DEV. In step 1908, the originating Com_DEV may receive a training sequence from the destination Com_DEV. In step 1910, the originating Com_DEV may transmit data and/or PDUs to the destination Com_DEV. In step 1912, the originating Com_DEV may receive an acknowledgment (ACK) PDU from the destination Com_DEV. The ACK PDU may correspond to at least a portion of the data and/or PDUs that were transmitted during step 1910.

Figure 19B:
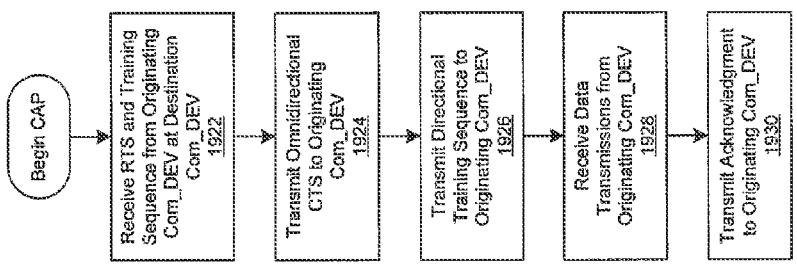
FIG. 19B is a flowchart that illustrates exemplary steps for asynchronous communication utilizing omnidirectional CTS transmission, in accordance with an embodiment of the invention.

FIG. 19B is a flowchart that illustrates exemplary steps for asynchronous communication utilizing omnidirectional CTS transmission, in accordance with an embodiment of the invention. Referring to FIG. 19B, in step 1922, a destination Com_DEV may receive an RTS frame and training sequence. The RTS frame may identify an originating Com_DEV. In step 1924, the destination Com_DEV may transmit a CTS frame to the originating Com_DEV utilizing omnidirectional signal transmission. In step 1926, the destination Com_DEV may transmit a training sequence to the originating Com_DEV utilizing directional signal transmission. In step 1928, the destination Com_DEV may receive data and/or PDUs from the originating Com_DEV. In step 1930, the destination Com_DEV may transmit an acknowledgment (ACK) PDU to the originating Com_DEV in response to at least a portion of the received data an/or PDUs.

Figure 19C:
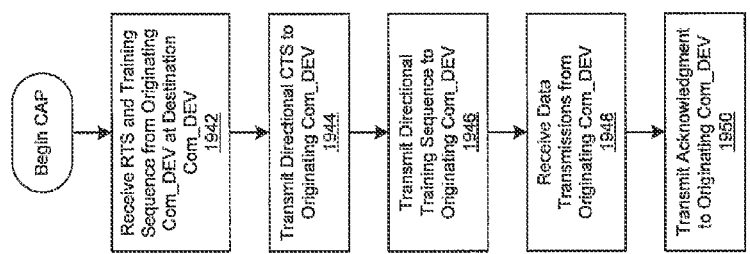
FIG. 19C is a flowchart that illustrates exemplary steps for asynchronous communication utilizing directional CTS transmission, in accordance with an embodiment of the invention.

FIG. 19C is a flowchart that illustrates exemplary steps for asynchronous communication utilizing directional CTS transmission, in accordance with an embodiment of the invention. Referring to FIG. 19C, in step 1942, a destination Com_DEV may receive an RTS frame and training sequence. The RTS frame may identify an originating Com_DEV. In step 1944, the destination Com_DEV may transmit a CTS frame to the originating Com_DEV utilizing directional signal transmission. In step 1946, the destination Com_DEV may transmit a training sequence to the originating Com_DEV utilizing directional signal transmission. In step 1948, the destination Com_DEV may receive data and/or PDUs from the originating Com_DEV. In step 1950, the destination Com_DEV may transmit an acknowledgment (ACK) PDU to the originating Com_DEV in response to at least a portion of the received data an/or PDUs.

Figure 20:
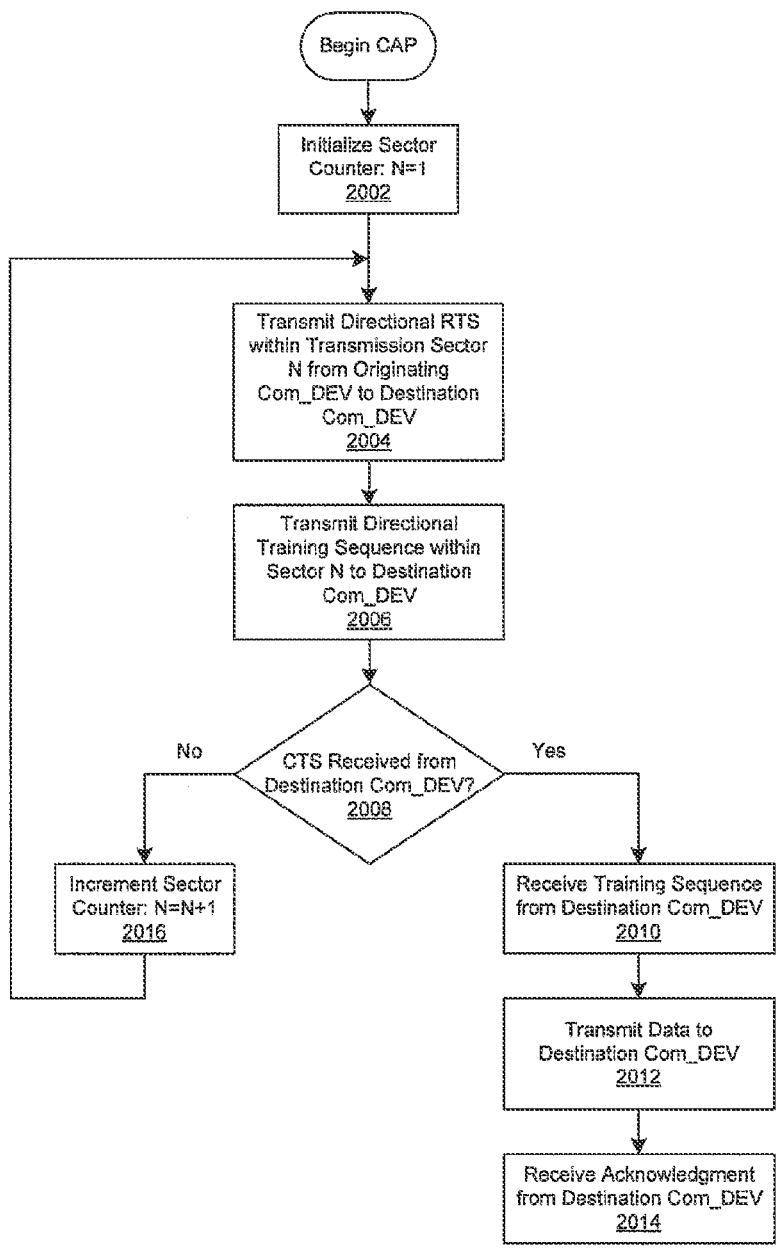
FIG. 20 is a flowchart that illustrates exemplary steps for asynchronous communication utilizing directional RTS transmission, in accordance with an embodiment of the invention.

FIG. 20 is a flowchart that illustrates exemplary steps for asynchronous communication utilizing directional RTS transmission, in accordance with an embodiment of the invention. In various embodiments of the invention, an originating Com_DEV may transmit RTS frames utilizing directional signal transmission in which an RTS frame is transmitted in the direction of a selected sector. The originating Com_DEV may transmit the RTS frame in the direction of subsequent selected sectors until a CTS frame is received in response. Referring to FIG. 20, in step 2002, a sector counter may be incremented: N=1, for example. In step 2004, an originating Com_DEV may transmit an RTS frame utilizing directional signal transmission in the direction of a selected Sector_N. The RTS frame may identify one or more destination Com_DEVs. In step 2006, the originating Com_DEV may transmit a training sequence to the destination Com_DEV utilizing directional signal transmission in the direction of the selected Sector_N. In step 2008, the originating Com_DEV may determine whether a CTS frame has been received in response to the RTS frame transmitted in step 2004. The originating Com_DEV may listen for the CTS frame response by utilizing directional receiving antenna(s) that are operable to receive signals in the direction of the selected Sector_N. In instances in which the originating Com_DEV determines that a CTS frame response has not been received, as determined at step 2008, in step 2016, the sector counter may be incremented: N=N+1, for example. Step 2004 may follow step 2016. The originating Com_DEV may transmit an RTS frame to a subsequent selected sector.

In instances in which the originating Com_DEV determines that a CTS frame response has been received, as determined at step 2008, in step 2010, the originating Com_DEV may receive a training sequence from the destination Com_DEV. In step 2012, the originating Com_DEV may transmit data and/or PDUs to the destination Com_DEV. In step 2014, the originating Com_DEV may receive an acknowledgment (ACK) PDU from the destination Com_DEV. The ACK PDU may correspond to at least a portion of the data and/or PDUs that were transmitted during step 1910.

Aspects of a method and system for optimal beamforming in a wireless network are presented. Aspects of the system may include one or more processors 1306 for use in a requesting communication device 112 wherein the one or more processors 1306 may be operable to request a transmission time slot allocation. A determination may be made by a coordinating communication device 102 as whether to assign a sector transmission time slot and/or beamforming transmission time slot to the requesting communication device 112 based on the transmission time slot allocation request. The one or more processors 1306 may be operable to receive the assigned sector transmission time slot and/or beamforming transmission time slot.

The one or more processors 1306 may be operable to receive a polling protocol data unit from the coordinating communication device 102 when the sector transmission time slot is assigned to the requesting communication device 112. The one or more processors 1306 may be operable to compute channel state information based on the received polling protocol data unit. A polling response protocol data unit may be transmitted to the coordinating communication device 102 in response to the received polling protocol data unit. The computed channel state information may be communicated via the transmitted polling response protocol data unit.

A training sequence may be transmitted to one or more destination communication devices 114 when the beamforming transmission time slot is assigned to the requesting communication device 112. A training sequence and/or channel state information may be received from at least one of the one or more destination communication devices 114 in response to the transmitted training sequence. Computed channel state information may be transmitted to at least one of the one or more destination communication devices 114. The channel state information may be computed based on the received training sequence. A precoding matrix may be computed based on the received channel state information. Signals for beamformed signal transmission to at least one of the one or more destination communication devices 114 based on the computed precoding matrix.

Another embodiment of the invention may provide a machine and/or computer readable medium, having stored thereon, a computer program having at least one code section executable by a machine and/or computer, thereby causing the machine and/or computer to perform the steps as described herein for optimal beamforming in wireless networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of communications, comprising:
   receiving, by a communications coordinator device, an association protocol data unit (PDU) from a communications device;
   determining, at the communications coordinator device, whether the communications device supports beamformed communications;
   receiving, at the communications coordinator device, a time slot assignment request from the communications device;
   generating, by the communications coordinator device, a neighborhood map that identifies locations of the other communication devices with respect to the communications coordinator device using angle of arrival of signals from the communications device and angle of arrivals of signals from other communications devices; and
   generating, by the communications coordinator device, a time slot assignment based on whether the communications device supports beamformed communications and the neighborhood map.

2. The method according to claim 1, wherein the association PDU comprises a request from the communications device to authenticate and associate with the communications coordinator device.

3. The method according to claim 1, further comprising, before receiving the association PDU, transmitting a beacon PDU using omnidirectional signal transmission.

4. The method according to claim 1, comprising:
   receiving the association PDU comprises receiving the association PDU during an omnidirectional contention access period (omni-CAP); and
   receiving the time slot assignment request comprises receiving the time slot assignment request during an omni-CAP request period.

5. The method according to claim 1, wherein generating the time slot assignment comprises:
   when it is determined that the communications device does not support beamformed communications, determining a sector in which the communications device is located; and
   assigning a sector transmission time slot to the communications device based on an available sector channel time allocation (CTA) time slot for the sector.

6. The method according to claim 1, wherein generating the time slot assignment further comprises, when it is determined that the communications device does support beamformed communications, assigning a beamformed transmission time slot to the communications device based on an available beamformed channel time allocation (CTA) time slot.

7. The method according to claim 5, wherein determining the sector in which the communications device is located comprises determining the sector based on at least one of the angle of arrival of signals received from the communications device and the neighborhood map.

8. The method according to claim 7, further comprising transmitting a training sequence to the communications device after assigning the beamformed transmission time slot.

9. A communications coordinator device, comprising:
   a transceiver coupled to at least one antenna and configured to perform wireless communications;
   a memory; and
   a processor circuit coupled to the memory and configured to:
   receive an association protocol data unit (PDU) from a communications device;
   determine whether the communications device supports beamformed communications;
   generate a neighborhood map that identifies locations of the other communication devices with respect to the communications coordinator device using angle of arrival of signals from the communications device and angle of arrivals of signals from other communications devices; and
   generate a time slot assignment based on whether the communications device supports beamformed communications and the neighborhood map.

10. The device according to claim 9, wherein the processor circuit is further configured to receive a time slot assignment request from the communications device.

11. The device according to claim 9, wherein the association PDU comprises a request from the communications device to authenticate and associate with the communications coordinator device.

12. The device according to claim 9, wherein the processor circuit is further configured to transmit a beacon PDU using omnidirectional signal transmission.

13. The device according to claim 9, wherein the processor circuit is further configured to:
   receive the association PDU during an omnidirectional contention access period (omni-CAP); and
   receive a time slot assignment request during an omni-CAP request period.

14. The device according to claim 9, wherein the processor circuit is further configured to:
   when it is determined that the communications device does not support beamformed communications, determine a sector in which the communications device is located; and
   assign a sector transmission time slot to the communications device based on an available sector channel time allocation (CTA) time slot for the sector.

15. The device according to claim 9, wherein the processor circuit is further configured to, when it is determined that the communications device does support beamformed communications, assign a beamformed transmission time slot to the communications device based on an available beamformed channel time allocation (CTA) time slot.

16. The device according to claim 14, wherein the processor circuit is further configured to determine the sector based on at least one of the angle of arrival of signals received from the communications device and the neighborhood map.

17. A method of communications, comprising:
   receiving, by a communications coordinator device, a time slot assignment request from a communications device;
   determining, by the communications coordinator device, whether the communications device supports beamformed communications;
   generating, by the communications coordinator device, a neighborhood map that identifies locations of the other communication devices with respect to the communications coordinator device using angle of arrival of signals from the communications device and angle of arrivals of signals from other communications devices; and
   generating, by the communications coordinator device, a time slot assignment based on whether the communications device supports beamformed communications and the neighborhood map.

18. The method according to claim 17, wherein generating the time slot assignment comprises:
   when it is determined that the communications device does not support beamformed communications, determining a sector in which the communications device is located; and
   assigning a sector transmission time slot to the communications device based on an available sector channel time allocation (CTA) time slot for the sector.

19. The method according to claim 17, wherein generating the time slot assignment further comprises, when it is determined that the communications device does support beamformed communications, assigning a beamformed transmission time slot to the communications device based on an available beamformed channel time allocation (CTA) time slot.

20. The method according to claim 18, wherein determining the sector in which the communications device is located comprises determining the sector based on at least one of the angle of arrival of signals received from the communications device and the neighborhood map.

* * * * *